(12) United States Patent
Akey et al.

(10) Patent No.: US 12,703,081 B2
(45) Date of Patent: Aug. 11, 2026

(54) DYNAMIC TEACHING SYSTEM AND METHOD FOR PROGRAMMING, CONTROLLING, AND OPTIMIZING COLLABORATIVE ROBOT WELDING AND CUTTING SYSTEMS' PROCESSING PATHS AND FOR PROGRAMMING PROCESS TEMPLATES RELATED THERETO

(71) Applicant: Vectis Automation, LLC, Loveland, CO (US)

(72) Inventors: Andrew Akey, Windsor, CO (US); Joshua Pawley, Windsor, CO (US); Douglas Rhoda, Timnath, CO (US); Alex Roerty, Berthoud, CO (US); Mike Irlbeck, Loveland, CO (US); Marcus Yakawich, Windsor, CO (US)

(73) Assignee: Vectis Automation, LLC, Loveland, CO (US)

( * ) Notice: Subject to any disclaimer, the term of this patent is extended or adjusted under 35 U.S.C. 154(b) by 85 days.

(21) Appl. No.: 18/630,880

(22) Filed: Apr. 9, 2024

(65) Prior Publication Data

US 2024/0335939 A1 Oct. 10, 2024

Related U.S. Application Data

(60) Provisional application No. 63/566,450, filed on Mar. 18, 2024, provisional application No. 63/495,111, filed on Apr. 9, 2023.

(51) Int. Cl.

| | |
|---|---|
| ***B25J 9/00*** | (2006.01) |
| ***B23K 9/095*** | (2006.01) |
| ***B25J 11/00*** | (2006.01) |

(52) U.S. Cl.

CPC ........... *B25J 9/0081* (2013.01); *B23K 9/0953* (2013.01); *B25J 9/0009* (2013.01); *B25J 11/005* (2013.01)

(58) Field of Classification Search

CPC ...... B25J 11/005; B25J 9/0009; B25J 9/0081; B25J 9/163; B25J 9/1679; B25J 11/0055; B25J 19/06; B25J 5/00; B25J 9/162; B25J 9/1664; B25J 9/1674; B23K 10/00; B23K 37/02; G05B 2219/35422; G05B 2219/36167; G05B 2219/39443; G05B 2219/40202; G05B 2219/39449; G05B 19/427; G05B 2219/39001; G05B 2219/40201; G05B 2219/40298; G05B 2219/45104

USPC ............ 318/568.11, 568.12, 568.13, 568.23, 318/568.25; 901/1, 2, 8, 14, 36, 42

See application file for complete search history.

(56) References Cited

U.S. PATENT DOCUMENTS

| | | | | |
|---|---|---|---|---|
| 2020/0171674 | A1* | 6/2020 | Roziere | B25J 19/02 |
| 2023/0390848 | A1* | 12/2023 | Christy | B25J 9/163 |
| 2024/0326178 | A1* | 10/2024 | Aas | B23K 26/0884 |

* cited by examiner

*Primary Examiner* — Antony M Paul
(74) *Attorney, Agent, or Firm* — Glenn H. Lenzen; Elevated IP, LLC

(57) ABSTRACT

A dynamic programmable teaching system adapted to program and control the operation of collaborative robot welding and cutting systems, minimize the need to use a teach pendant for programming and to provide visual feedback in order to optimize or correct operational processing parameters for any given welding or cutting task.

12 Claims, 26 Drawing Sheets

126
127
125
124

128
123
122
129
130
120
121
118
117

119
115
116

DYNAMIC TEACHING SYSTEM AND METHOD FOR PROGRAMMING, CONTROLLING, AND OPTIMIZING COLLABORATIVE ROBOT WELDING AND CUTTING SYSTEMS' PROCESSING PATHS AND FOR PROGRAMMING PROCESS TEMPLATES RELATED THERETO

CROSS-REFERENCE TO RELATED APPLICATIONS

This application claims priority to U.S. Provisional Patent Application Ser. No. 63/495,111 filed Apr. 9, 2023, and to U.S. Provisional Patent Application Ser. No. 63/566,450 filed Mar. 18, 2024, the entire contents of both of which applications are incorporated herein by reference.

FIELD OF THE INVENTION

The present invention relates generally to cutting and welding systems. More specifically, the present invention relates to programmable control systems adapted for use with mobile robot welding and cutting systems. In particular, the present invention relates to a dynamic teaching system which permits an operator to easily program and optimize processing paths and operating parameters for collaborative robot welding and cutting systems and a method for creating operating process templates therefor.

BACKGROUND OF THE INVENTION

The fabrication of assemblies formed of metal structural elements and components having complex non-linear joint surfaces and edges requires the preparation and processing of the structural elements, for example, beveling the edges thereof, by skilled metal processing workers or by using complex, highly-automated systems designed to generate the precise edges mandated for quality joint fit up. The structural components may be manufactured using both ferrous and non-ferrous base metal alloys. The physical properties, chemical composition, sensitivity to oxidation and heat transfer characteristics of various alloys demand close attention to materials processing techniques used to fabricate a wide variety of structures and products. As noted above, joint fit up is critical to the fabrication of multicomponent products, particularly to the fabrication of multicomponent products that are adaptable to automated, high-volume production processes. Completed structures may be assembled by using mechanical fasteners, adhesives, materials joining techniques such as welding and brazing or a combination of some or all of the foregoing. Exemplary structures extend at one end of the spectrum from commonplace household appliances, furniture, exercise and lawn maintenance equipment to expensive and sophisticated space and airborne platforms, military equipment, scientific apparatus, chemical processing systems and medical devices fabricated from exotic metals. The list is endless.

Welding engineering is a highly-specialized discipline which requires knowledge of not only structures, materials and manufacturing processes, but also knowledge of specific materials cutting and joining processes and parameters including weld joint configuration and preparation, cutting and welding process selection, preheat and post heat requirements as needed to prevent cracking, and other variables. A knowledgeable and experienced metal processing worker such as a machinist or a welder may assess the requirements of a particular job based upon prior experience and may adjust one or more of the foregoing parameters to achieve the desired edge configuration with the precision required for proper assembly and the welding parameters such as wire feed rate, welding voltage and current, weaving parameters, travel speed, the angle between the torch and the work material (known in the art as the "work angle"), and, with respect to the welding process, the push/pull angle. However, a less experienced individual may not be able to set up a cutting or welding job without performing trial and error runs on test pieces, a process which is time consuming, inefficient, and costly.

Automated robot and positioning systems controlled by computer software programs have displaced manual cutting, machining and welding fabrication operations in many industries. Analogous to CAD/CAM machine tool equipment, automatic robot cutting and welding systems are designed to minimize or completely eliminate the variables associated with manual operations, reduce the tedium associated with repetitive tasks, and enhance productivity and efficiency. In addition to the foregoing, typically, qautomated cutting and welding systems include a work holding table or positioner and a device such as an extendable boom or a robot arm which holds the cutting or welding implement such as an oxyacetylene or plasma torch, a stick or a continuous feed wire electrode. Either or both of these positioning and implement holding devices may be programmed to rotate about or translate along one or more axes to define a work material processing path and may include multiple workstations which permit either welding or cutting a first workpiece at one station while an operator removes a completed component and sets up a new work piece at one or more different workstations Depending upon the application, automated robot welding and cutting systems can be massive assemblies requiring substantial acquisition and installation capital expenditures, dedicated floor space, safety systems, utility inputs for electrical power, hydraulics and/or cooling water; and overhead cranes or lateral material conveyance systems for work material and finished assembly transport. Although such systems may be designed for smaller manufacturing operations and may be moved from one location to another via forklift and pickup truck, a typical welding or cutting station or cell is not amenable for use with different welding or cutting systems, high mix, low volume production, or movement within a manufacturing facility without potentially disrupting other operations.

Materials processing operations such as machining, welding and cutting are so precise and the risks of property loss and/or personal injury to users of the end product structures and assemblies so pervasive in modern society are sufficiently high, that the setup and identification of the input variables in both manual and computer-controlled robot material processing operations, as well as the execution of a process selected for a given application, require manual input, a process that draws upon the skills and experience of the individual operator performing the task. However, a severe lack of skilled workers in today's workforce presents yet another challenge to meeting the demands of a highly consumptive economy. For example, in the welding cutting field, the American Welding Society estimates the average age of a welder to be 54 years old. The number of active welders is decreasing at a rate that is significantly higher than the entry rate of new welders into the field, and a potential shortage of approximately 360,000 welders in the United States is projected to exist by 2027. The situation is further exacerbated by socio-economic societal changes brought about by the expectations and demands of younger generations for higher paying jobs in what are viewed as the "high tech" fields of computer science, programming, communications, information technology, and the like. Traditional jobs in manufacturing, agriculture, foundries and mining are now viewed as less desirable or have migrated off-shore.

Various attempts to minimize cutting and welding parameter selection and input errors include the use of pre-prepared tables or mathematical equations to aid an operator in calculating setup parameters. Advances in process control technology include the integration of a graphical user interface into a cutting power supply control system and user interface and display systems having processors which receive and analyze the power supply parameter settings in real time during a process cycle. The display is configured to send a pictograph warning graphically to the system operator in response to the detection of maladjustment in a parameter setting. While such control systems have been important contributions to the manufacturing industry, these and other prior art systems require complex off-site programming and operator training to properly set up and operate the systems. These systems are further limited by high capital acquisition costs and limited versatility for use across multiple and diverse applications.

As noted above, automated robot and positioning systems controlled by computer software programs have displaced manual cutting, machining and welding fabrication operations in many industries. Analogous to CAD/CAM machine tool equipment, automatic robot cutting and welding systems are designed to minimize or completely eliminate the variables associated with manual operations, reduce the tedium associated with repetitive tasks, and enhance productivity and efficiency. In addition to the foregoing, typically, automated welding and cutting systems include a work holding table or positioner and a device such as an extendable boom or a robot arm which holds the welding or cutting implement. Either or both of these positioning and implement holding devices may be programmed to rotate about or translate along one or more axes to define a welding or cutting path and may include multiple workstations which permit processing of a first workpiece at one station while an operator removes a completed component and sets up a new work piece at a different station.

In the joining process performed after the afore-mentioned joint preparations are completed, optimal weld quality depends not only on proper welding parameter settings, but also on physical consistency of the path and angle of the weld torch, intangibles which may be influenced by an individual welder's skills; variable situational influences including concentration, fatigue, and health issues; and operating environment factors such as heat, humidity, lighting and ventilation. These factors are particularly influential on weld quality where the welding process is performed with a hand-held electrode or torch.

Consequently, manufacturers are under tremendous stress to increase manufacturing productivity through automation but currently have only risky and costly options to do so. Traditional robotic system solutions are a significant financial risk, bulky and expensive, with long delivery times, significant set-up time and cost, and what operations managers view as "well, no-turning-back now" risk. While larger corporations may be able to bear the cost and risk of traditional automation, the smaller shops that make up 75% of America's 250,000+ manufacturers are prohibited by the high capital investment requirements from availing themselves of the advantages offered by either partially or fully automated systems.

In view of the above, it is evident on the one hand that demands in the cutting and welding industry for reliable, consistent and repeatable materials processing and fabrication processes may be satisfied by sophisticated and very costly automated systems that minimize the potentially adverse and unpredictable effects of human and process variables on weld quality. However, conflicting demands for relatively inexpensive, mobile and versatile systems capable of producing end products and components therefor of the highest quality that may also be set up and operated by less experienced individuals in high mix, low volume production environments create a tension in the manufacturing industry that heretofore has not been addressed by prior art systems.

Moreover, setting up and programming a process template for a given welding or cutting operation to be performed on a computer-controlled collaborative robot welding or cutting system typically requires programming skills that an individual operator may not have. Recent developments in system control technology have resulted in the promulgation of "teach pendants" which allow an operator who does not have computer programming training to input a weld or cutting path and associated variables into a cobot welding or cutting system on a job by job basis. However, template programs typically must be re-written every time an operator or programmer wants to produce a new part. For example, a flight recorder style of programming saves every location on the path to a weld or pick position. Nevertheless, using this type of programming, the program is created from scratch each time it is used for a new application, which requires the programmer to select and adjust the process data as opposed to selecting a template program that already has the basic structure and requires the adjustment of only a few points.

Most of the time a programmer will copy/paste or save an existing program to serve as the basis for a new program, but this approach rapidly becomes unwieldly and difficult to manage if each program is only slightly different in length or position in the working space of the cobot. By way of example, a heavy multipass weld that is linear requires only two driving template points and six passes. Once the core process and stacking pattern for the multipass weld is defined, the only program elements needing adjustment are the two driving template points for each part.

Applicant has addressed this problem in its current product offerings as may be viewed on its website at https://vectisautomation.com. It's patent-pending cobot welding and cutting systems include programming or hand-guided jog buttons operatively connected to a robot controller and to a teach pendant adapted to allow an operator to set up and program the welding system in an intuitive and graphical manner without a need to constantly refer to a programming instruction manual. While this system has been well received and is in widespread use in applicant's customer base, applicant's on-going research and development efforts have resulted in additional refinements and improvements to its programming and control system and methodology to address the above-referenced programming, process control, and optimization problems. Accordingly, it will be apparent to those skilled in the art from this disclosure that the refinements and improvements to the programming and control system and methodology of present invention addresses the aforementioned needs in the art for collaborative robot materials processing systems having simplified programming and control systems that can be set up and programmed intuitively by an operator using push or programming buttons providing instantaneous feedback to operator input parameters and allow up-front process parameter optimization without the need for constant reliance on a teach pendant or significant computer programming and coding training. The novel features of the unique and dynamic teaching and programming system of the instant invention will become apparent to those skilled in the art from the accompanying disclosure and drawings.

SUMMARY OF THE INVENTION

In accordance with the embodiments of the present invention, a dynamic programmable teaching system is disclosed which is adapted to program and control the operation of collaborative robot welding and cutting systems and to optimize or correct operational processing parameters for any given welding or cutting task.

In an embodiment, the dynamic teaching system allows an operator to adjust a particular welding or cutting program quickly in real time in response to variations in work materials and/or parts and assemblies being processed.

In another embodiment, the dynamic programmable teaching system enables an operator or a programmer to guide a robot arm portion of collaborative robot welding and cutting systems to a preselected position in a welding or cutting path by hand.

In still another embodiment the dynamic programmable teaching system includes a user interface adapted to allow programming to be completed in an intuitive and graphical manner without requiring significant and specific education, training or computer programming and coding experience or skills.

In yet another embodiment, the dynamic programmable teaching system includes template programs which do not have to be rewritten each time an operator desires to process a new part.

In still another embodiment, the template programs include one or more key points which drive the template program.

In another embodiment, the template programs include flags which prompt an operator to update the key points driving the template program in a real time teaching mode.

In another embodiment, the dynamic programmable teaching system includes a housing operatively connected to a collaborative robot welding or cutting system, the housing adapted to contain one or more control actuators for inputting commands to the collaborative robot welding or cutting system.

In still another embodiment, the one or more control actuators are lighted indicators adapted to provide feedback via the dynamic programmable teaching system to an operator of the status of the collaborative robot welding or cutting system.

In yet another embodiment, the one or more control actuators are lighted pushbuttons, each lighted pushbutton having a different color.

In another embodiment, the one or more control actuators or lighted d pushbuttons is adapted to provide blinking light feedback to an operator in response to input commands, system status, welding or cutting program sequence status, or welding or cutting program sequence problems.

These and other features, aspects and advantages of the present invention will become apparent to those skilled in the art from the following detailed description of preferred embodiments taken in connection with the accompanying drawings, which are summarized briefly below.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claim and its equivalents.

Figure 1:
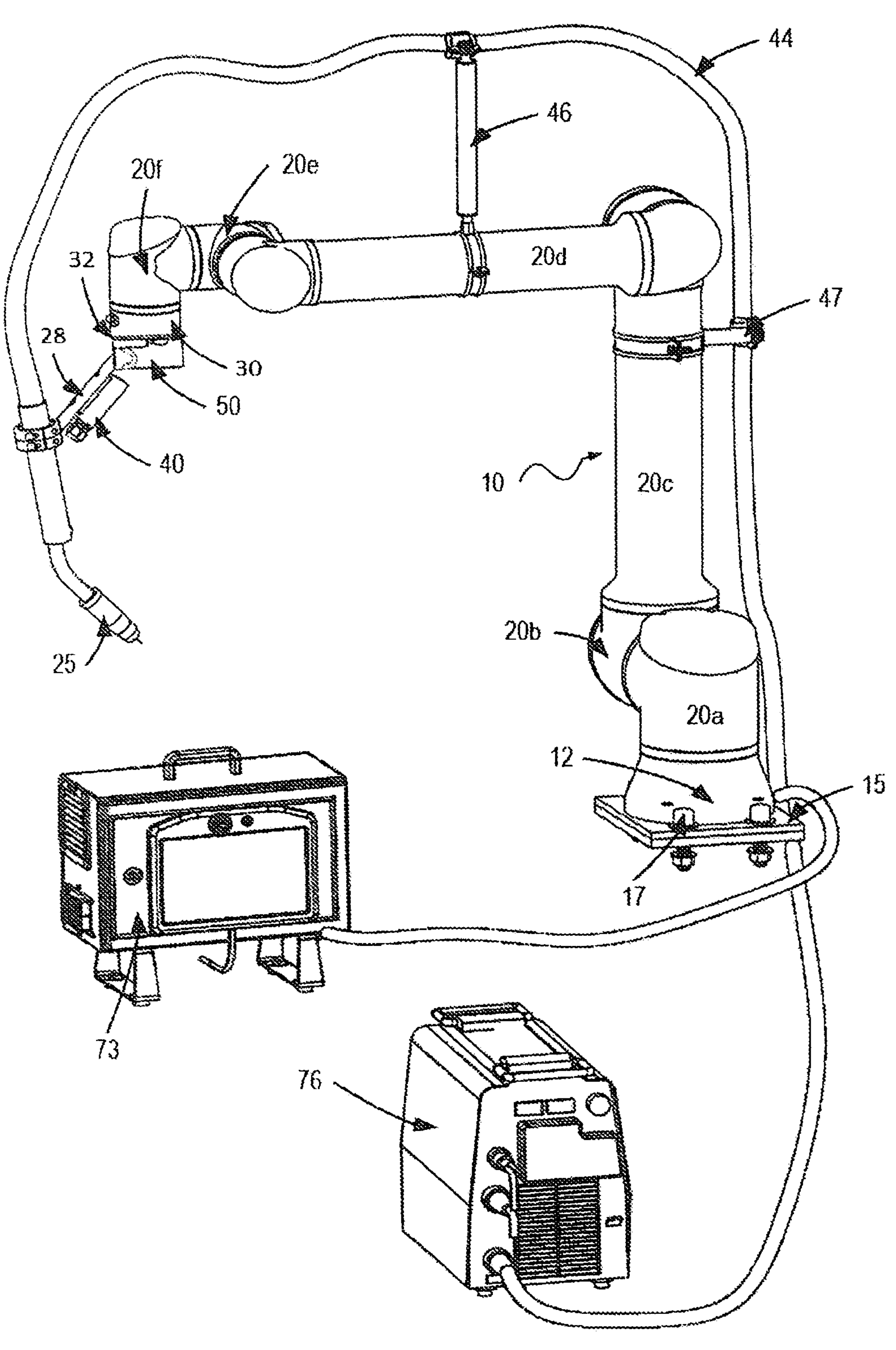
FIG. 1 is a side perspective view of the elements of a collaborative robot welding system adapted to be secured to either a mobile or a stationary base in accordance with an embodiment of the present invention.
Figure 2:
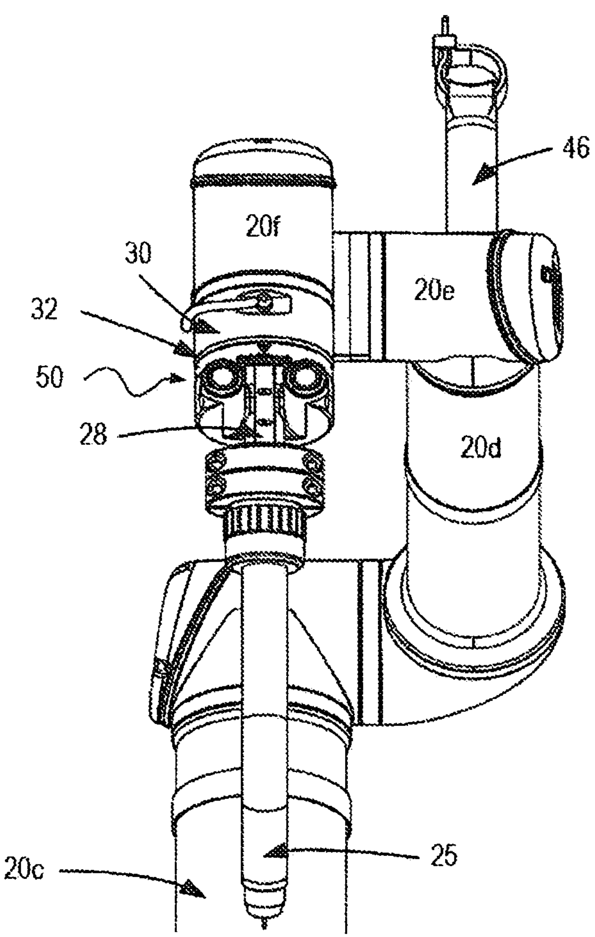
FIG. 2 is a front elevation view of portions of the system of FIG. 1.
Figure 3:
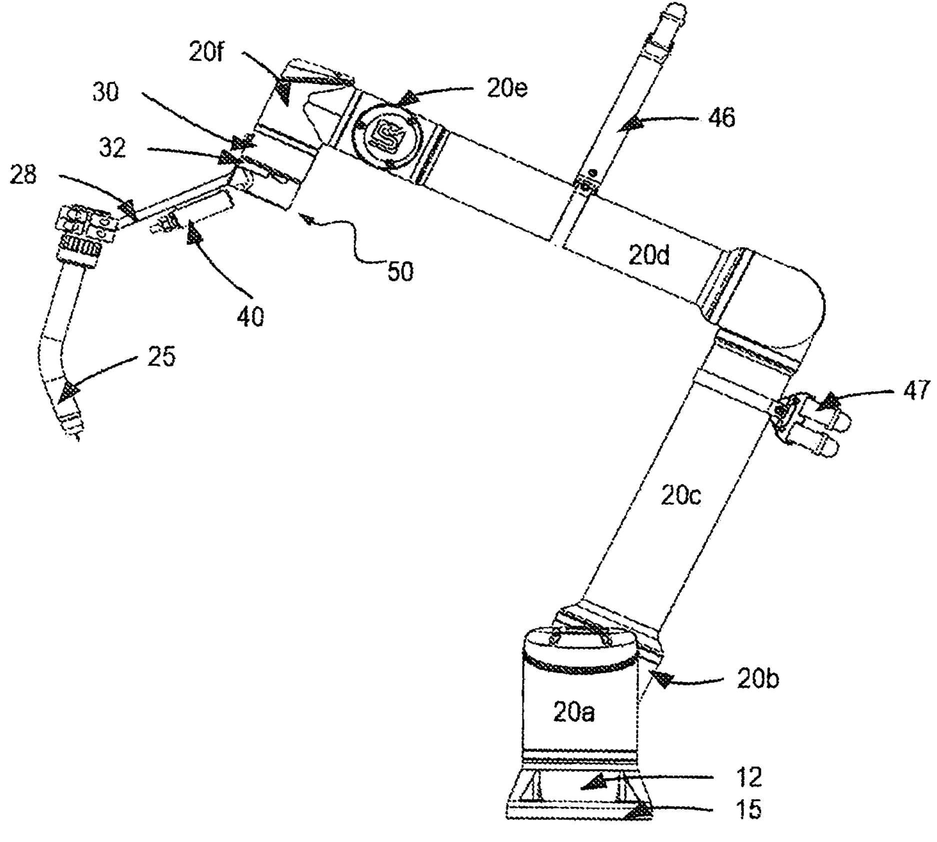
FIG. 3 is a right side elevation view of portions of the system of FIG. 1.
Figure 4:
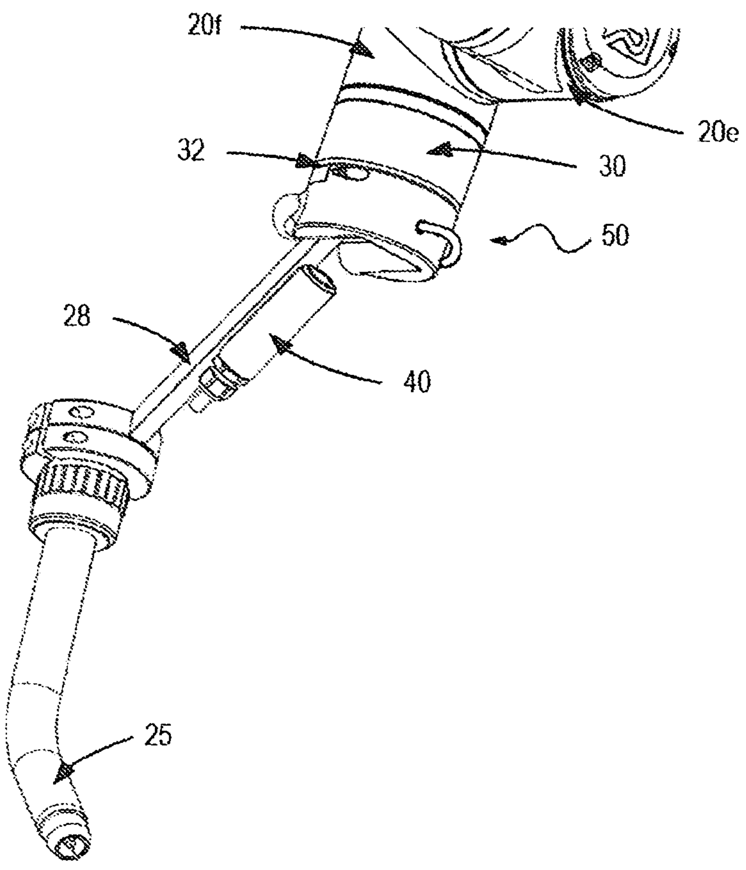
FIG. 4 is a rear isometric view of portions of the system of FIG. 1.
Figure 5:
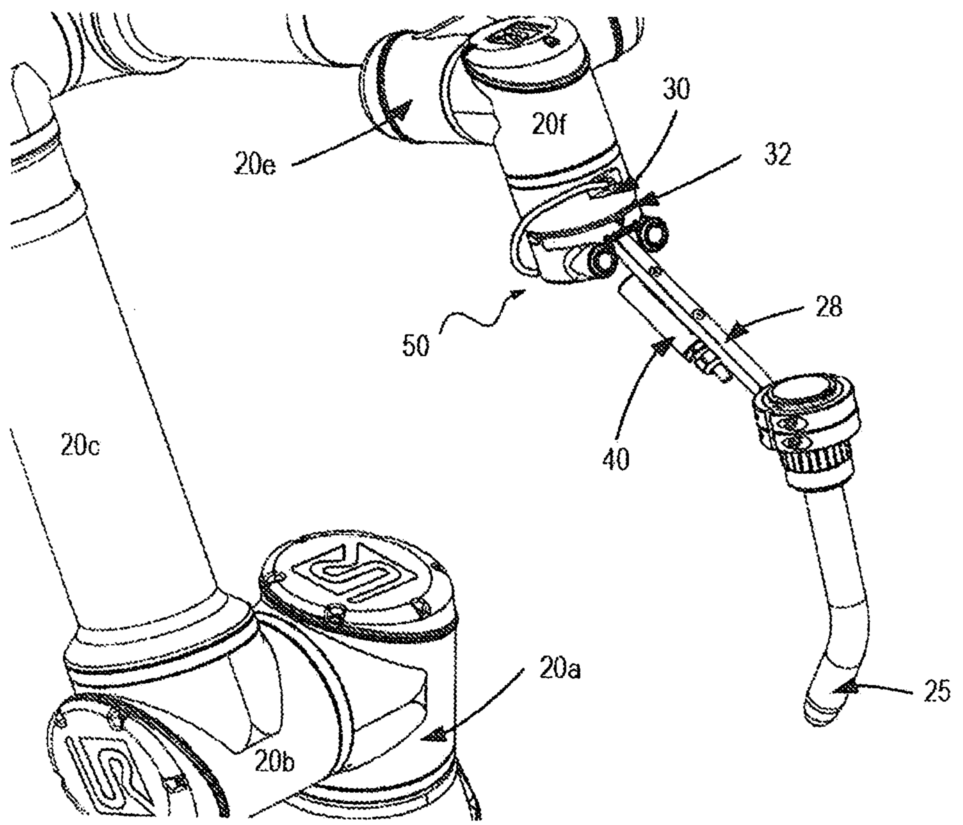
FIG. 5 is a front isometric view of portions of the system of FIG. 1.
Figure 6:
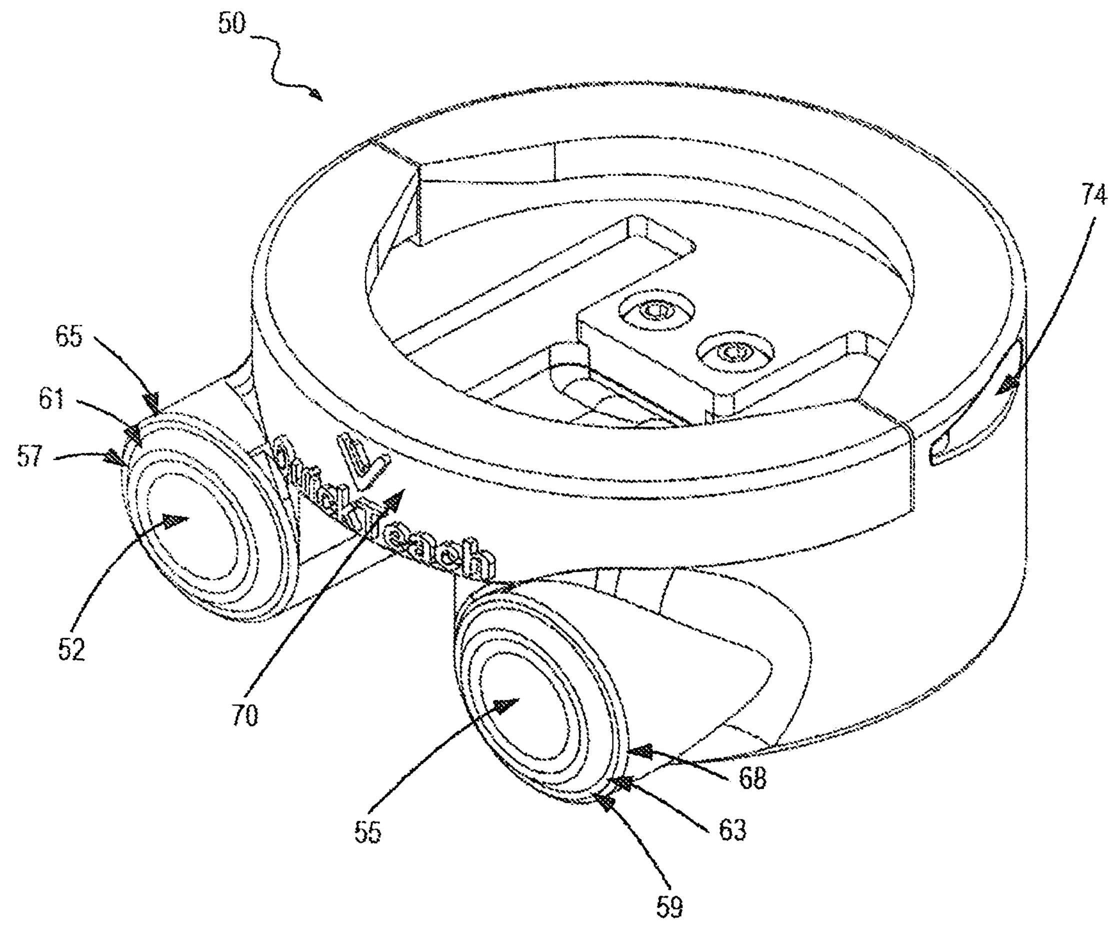
FIG. 6 is an enlarged front isometric view of a control system housing of a dynamic programmable teaching system portion of the collaborative robot welding system of FIG. 1.
Figure 7:
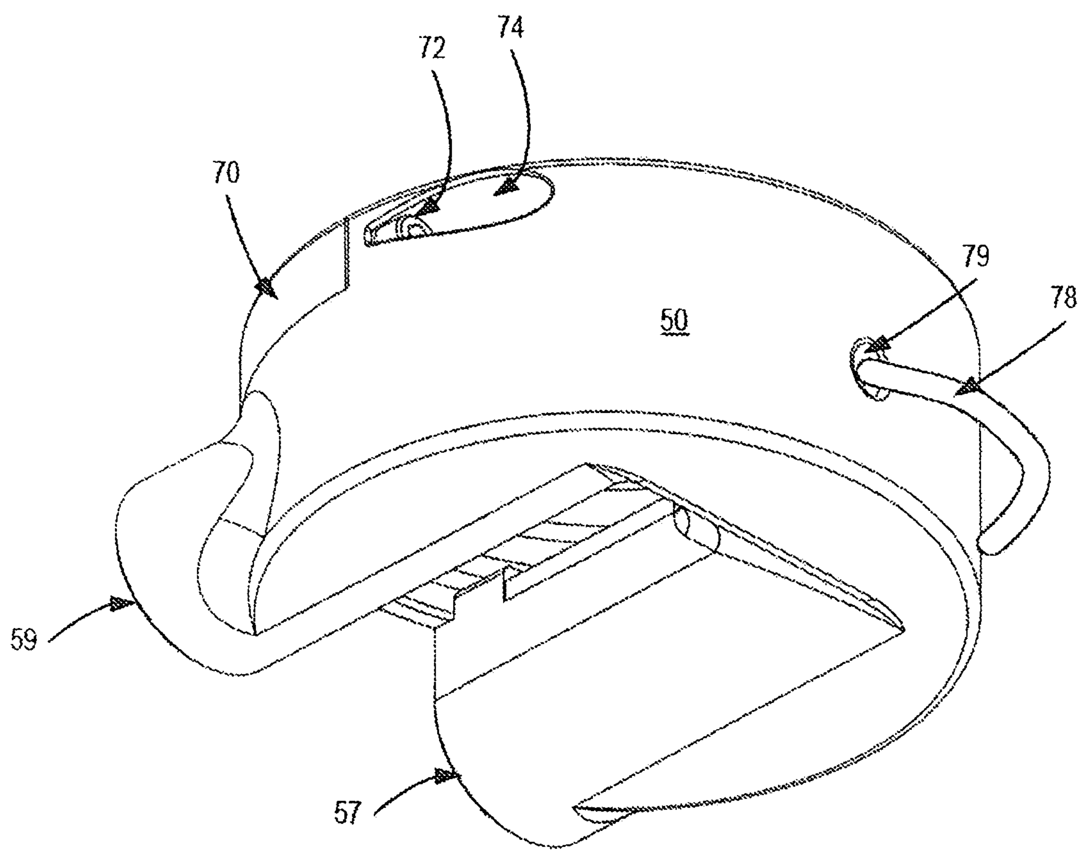
FIG. 7 is an enlarged rear isometric view of the control system housing shown in FIG. 6 illustrating the mounting provisions thereof in greater detail.
Figure 8:
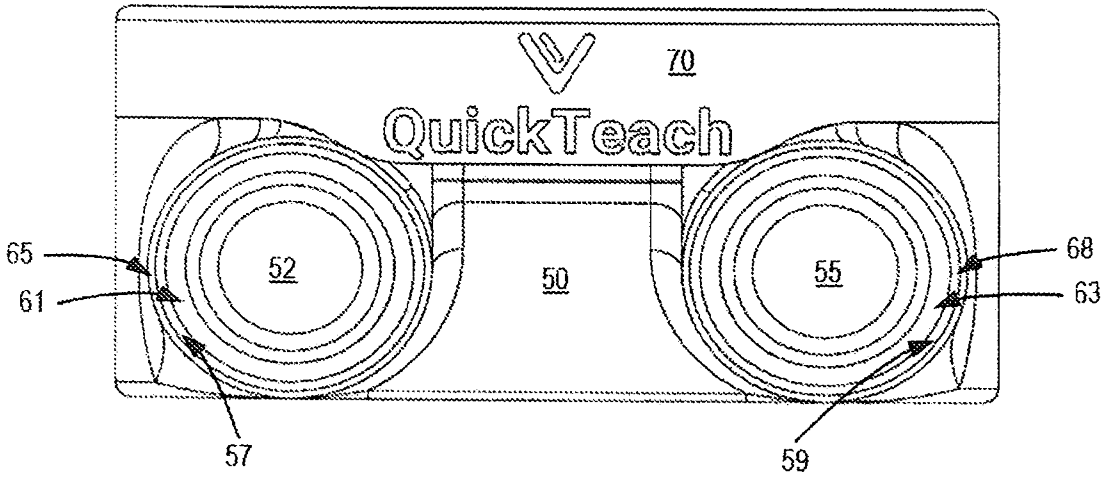
FIG. 8 is an enlarged front elevation view of the control system housing shown in FIG. 6 illustrating the control push buttons thereof in greater detail.
Figure 9:
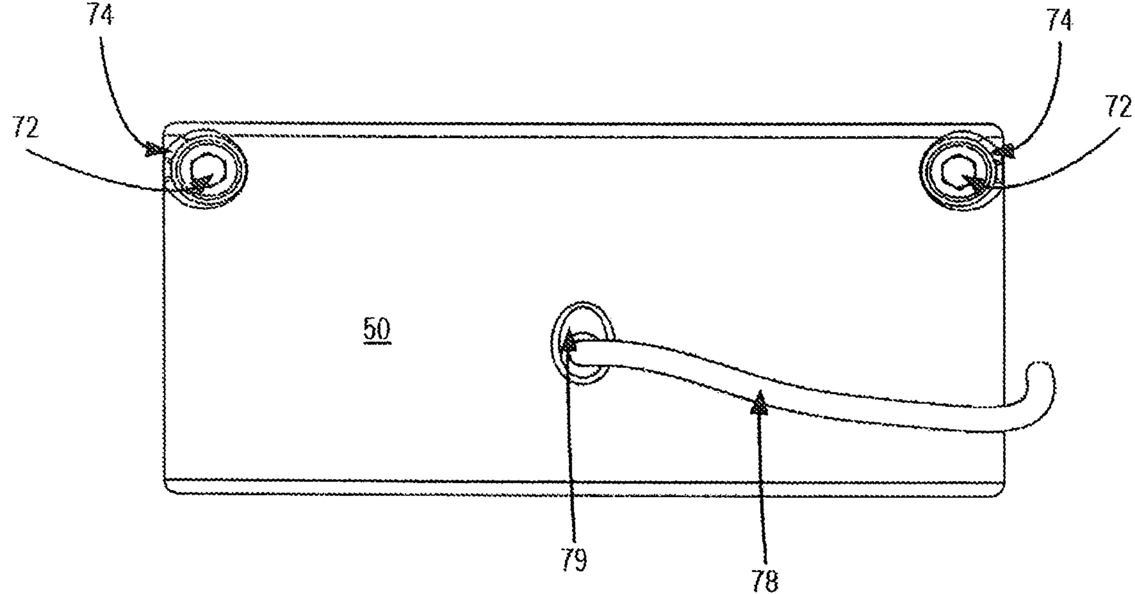
FIG. 9 is an enlarged rear view of the control system housing shown in FIG. 6.
Figure 10:
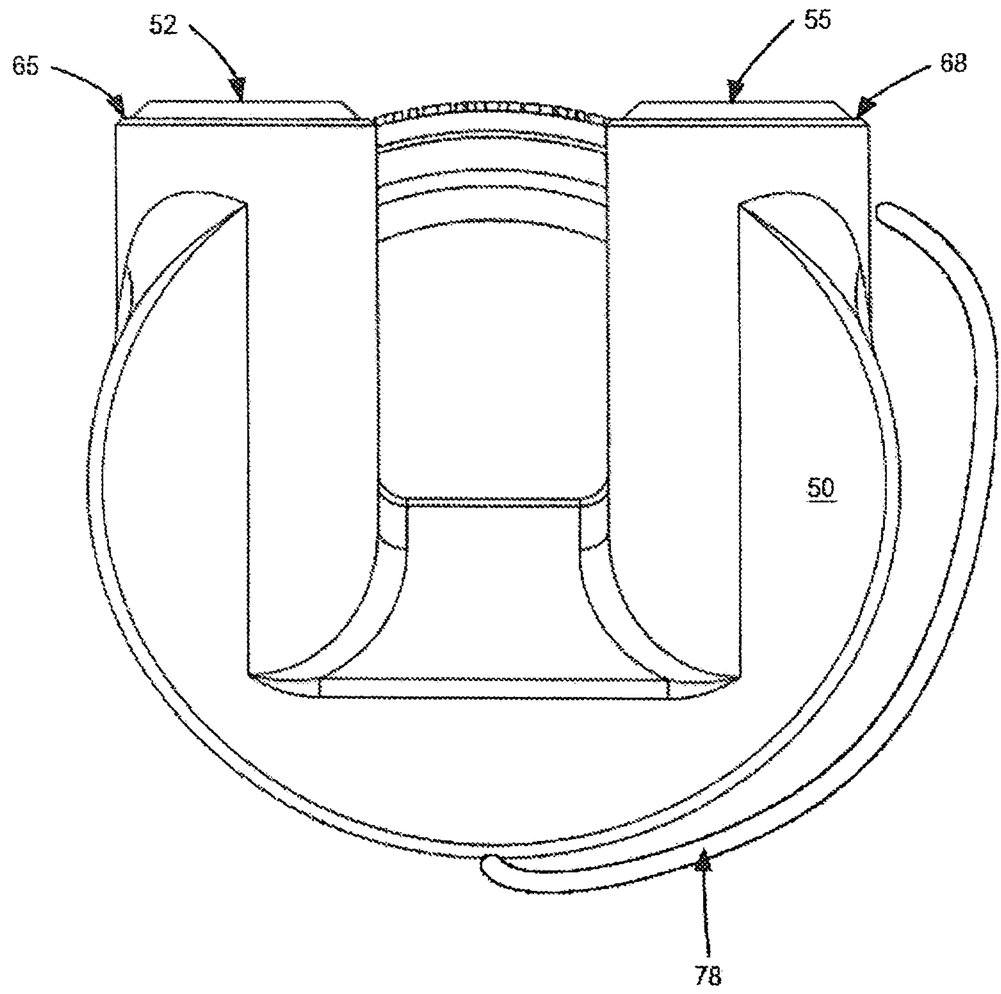
FIG. 10 is an enlarged bottom view of the control system housing shown in FIG. 6.
Figure 11:
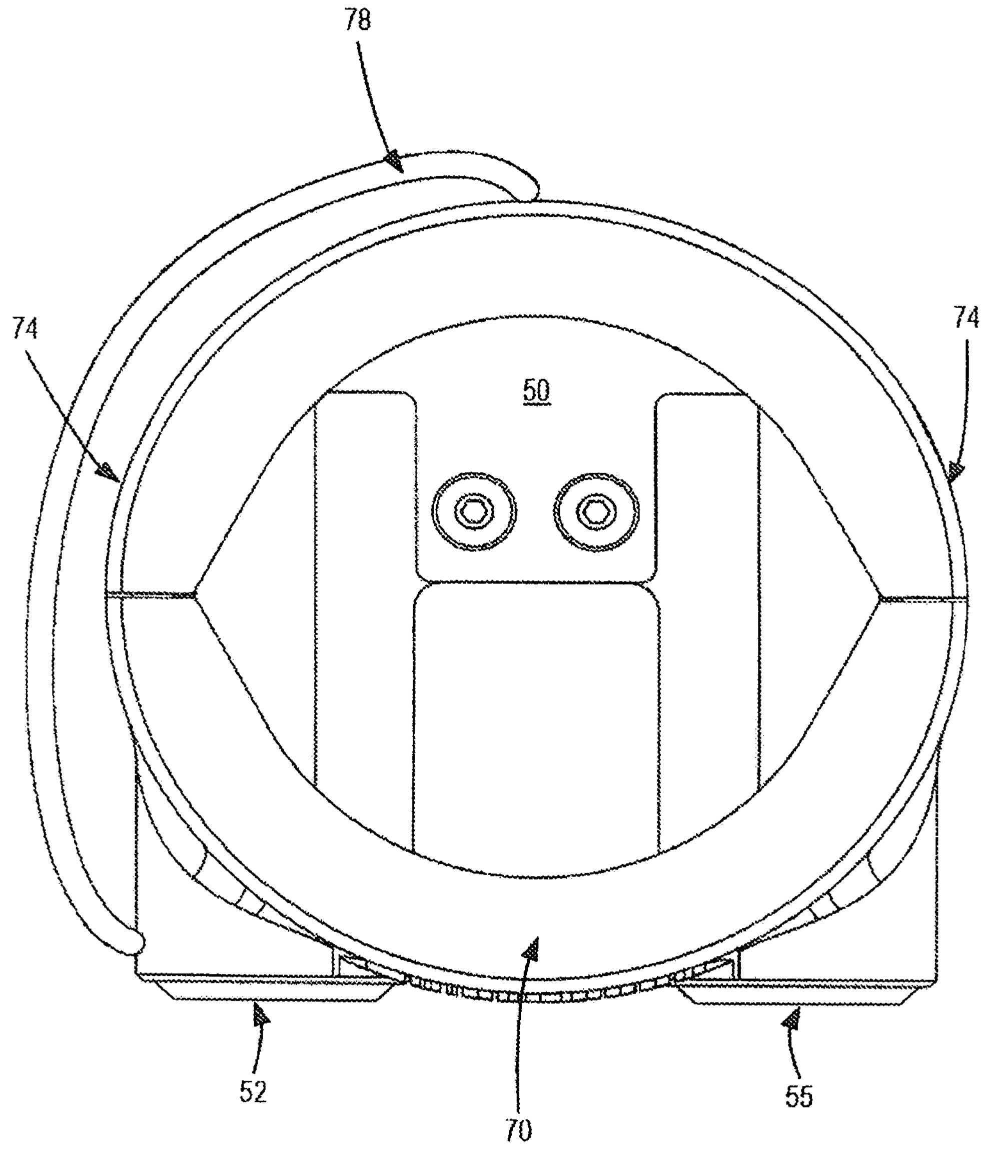
FIG. 11 is an enlarged top plan view of the control system shown in FIG. 6.

Referring initially to FIG. 1, and as shown in greater detail in FIGS. 2-5, a robot arm of a collaborative robot welding or cutting system, also referred to herein as the cobot, is shown generally at 10. The robot arm is operatively connected to a base 12, which, in turn, is mounted on an electrically isolating pad 15 secured by suitable fasteners 17 to an upper work surface of a worktable or a cart (not shown). The robot arm includes a plurality of arm segments 20_a_-20_f_ sequentially pivotally and/or rotatably interconnected to one another and structured and arranged to have a reach length or distance which depends upon the size of the robot arm selected for use and the lengths of its individual segments. A safety feature (not shown) is built into the control system and the robot arm and is structured and arranged to interrupt movement of the arm, should it come in contact with the operator or another object. A work processing implement 25 is secured via an attachment 28 to a flange 30 operatively connected to a distal end 32 of the robot arm, the implement being universally positionable and translatable along a preselected cut path in response to instructions from a robot controller, teach pendant and application programming interface (API) display illustrated schematically at 73. In the embodiment of FIG. 1, by way of example and not of limitation, the implement 25 is depicted in the form of a welding torch; however, it is to be understood that the system of the present invention also may be used with any cutting process without departing from the scope of the present invention.

A programming or hand-guided jog button 40 is secured to the attachment 28 and is operatively connected to a robot controller and teach pendant and, as will be described in greater detail below, is adapted to allow an operator or programmer, which designations are used interchangeably herein, to set up and program the system in an intuitive and graphical manner. Compressed air and welding or cutting consumables such as gas and wire are delivered from a central gas supply system or from individual gas cylinders along with electrical power cables via a torch bundle 44 supported by support arm or brackets 46, 47 secured to the robot arms 20_d_ and 20_c_ respectively and to the implement nozzle 25, as is known in the art. Power is provided to the welding or cutting implement via a power supply at 76, and the power supply, robot controller, teach pendant, and any ancillary power tools an operator may need all may be operatively connected to single phase power, for example, 120V power for the collaborative robot system and 240V power for the power supply. Optionally, the power supply may be connected to 208V, 480V or 575V three phase power.

Referring now to FIGS. 6-11, elements of a control system housing 50 mounted on the collaborative robot distal end 32 by way of a clamp piece 70, and securing hardware 72 mounted in recessed holes 74, and connect programming and control data entry actuators via a cable 78 exiting the housing at 79 (FIG. 7) of the dynamic programmable teaching system of the present invention to a collaborative robot welding or cutting system are shown. By way of example and not of limitation, in the embodiment shown, the programming and control data entry actuators are in the form of LED ring illuminated push buttons 52, 55, referred to herein for purposes of brevity as a push button or the push buttons, each being reciprocally coaxially positioned in a respective cavity or cylindrical aperture 57, 59 formed in control system housing 50. While two push buttons are shown, it is to be understood that three or more push buttons may be employed in the dynamic programmable teaching system to program, initiate, monitor and optimize welding and cutting process parameters and other variables.

Figure 12:
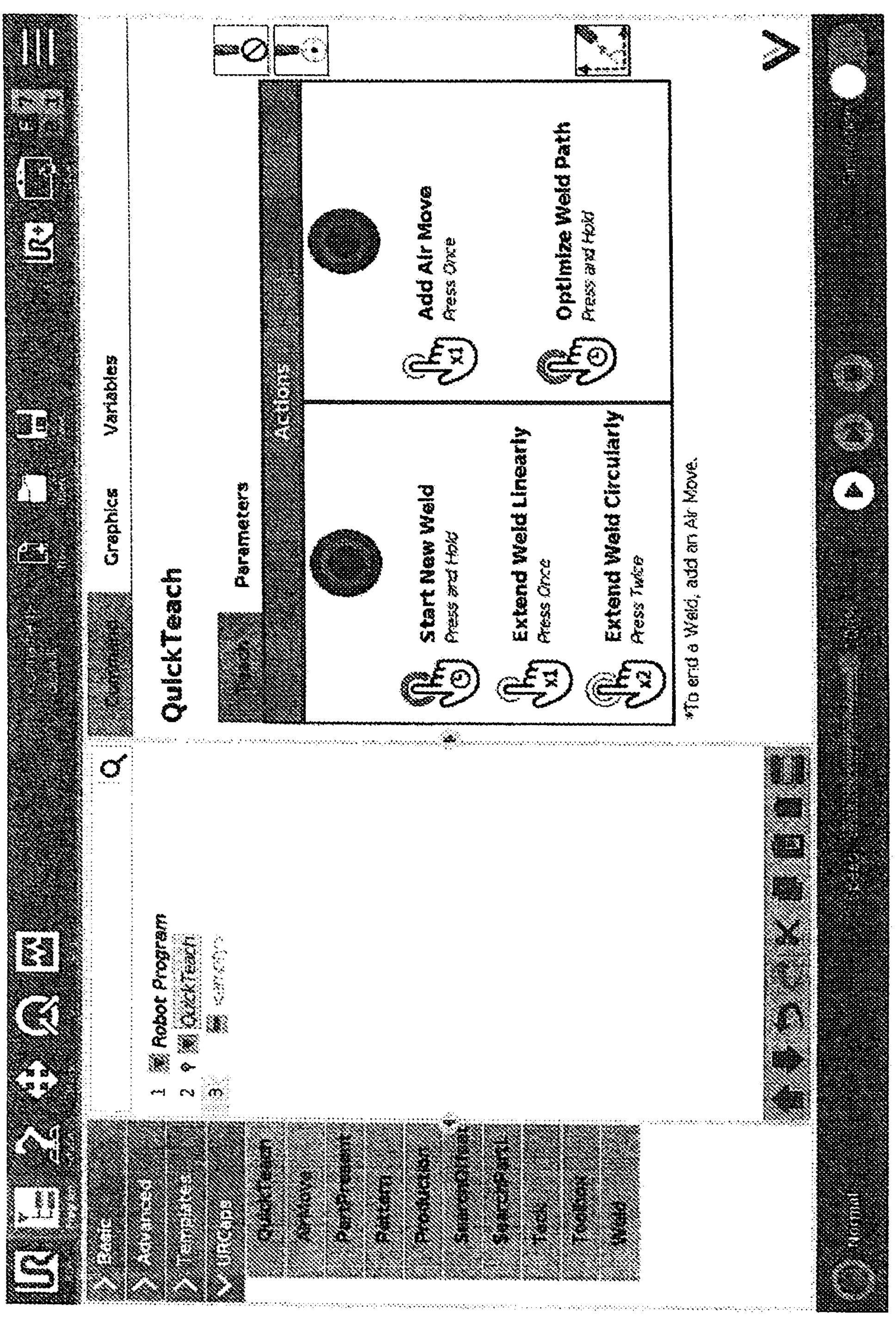
FIG. 12 is an exemplary screen shot of a program window in a teach pendant showing the Dynamic Teach node or QuickTeach and the associated commands, steps and visual image thereof.
Figure 14:
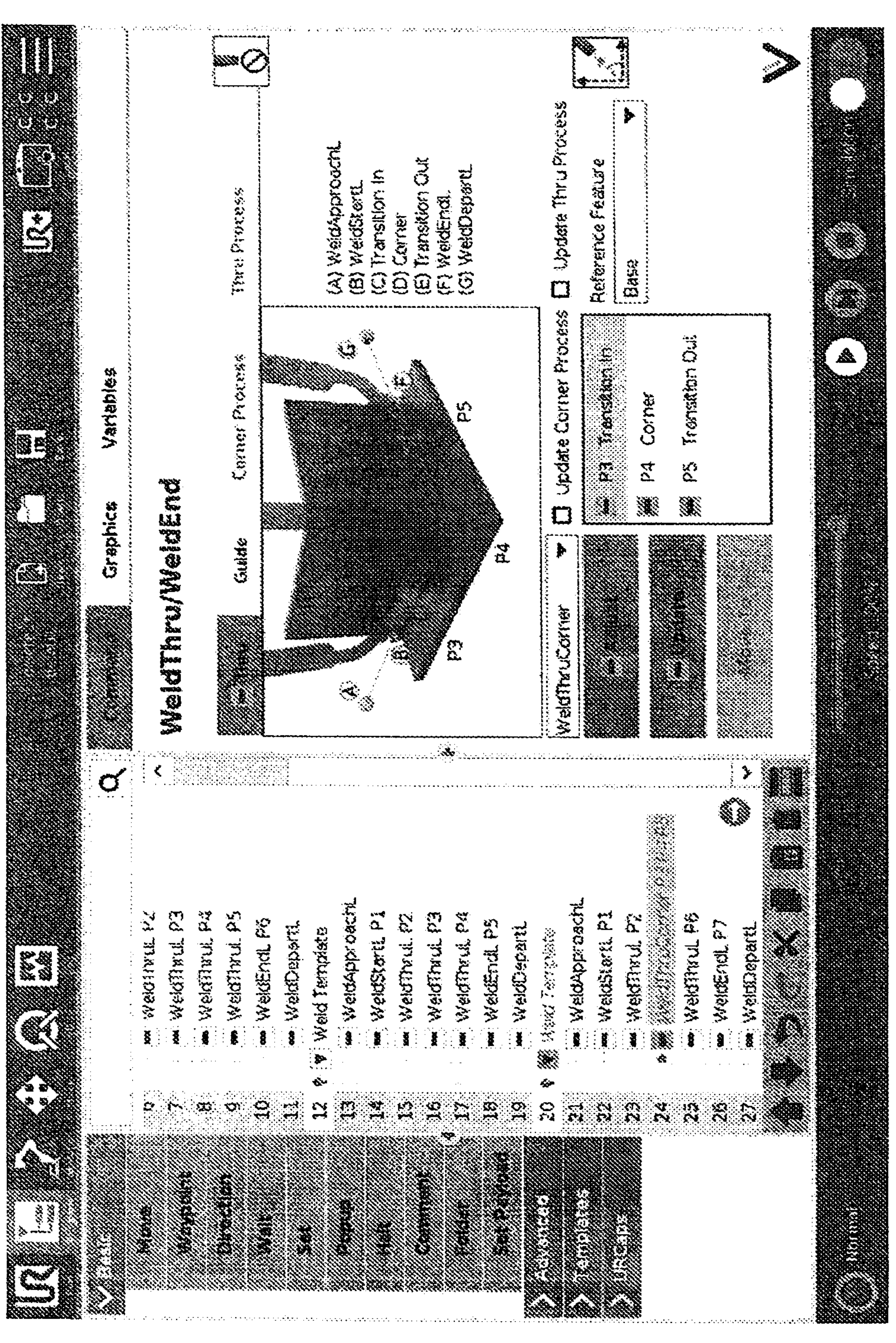
FIG. 14 is an exemplary screen shot of a program window in a teach pendant showing the commands, steps, and a visual image of a weld through a corner weld path.

Each of the push buttons is urged by a spring or similar biasing mechanism (not shown) in an outwardly direction against a respective stop member 61, 63 positioned at a respective outer rim 65, 68 of each of the cavities 57, 59. The push buttons are selectively illuminated by different colored LED's for example, red, blue, green, or amber, among other color options, in accordance with preselected system color choices. As will be described in greater detail below, the differently colored push buttons are selectively depressed by an operator or programmer to enter program data; initiate a welding or cutting sequence; selecting processing path air-move points, approach points, start points, way points, end points and depart points; accessing existing templates or creating new ones and so forth, as illustrated in FIG. 12. When a push button is depressed, an input voltage signal, by way of illustration, 24 volts, signals the dynamic programmable teaching system that the operator has depressed a push button. The push buttons may each be depressed two or more times in succession at selected intervals or held for a selected period of time to send different inputs to the dynamic programmable teaching system. An important feature of the dynamic programmable teaching system is the ease of programming and monitoring the welding or cutting processes without the need to refer repeatedly to a teach pendant. For purposes of illustration, an exemplary weld through a corner operation and associated input commands is illustrated in FIG. 14, which is a screen shot of a program window in a teach pendant showing the commands, steps and visual image of a weld though a corner weld path.

Figure 13:
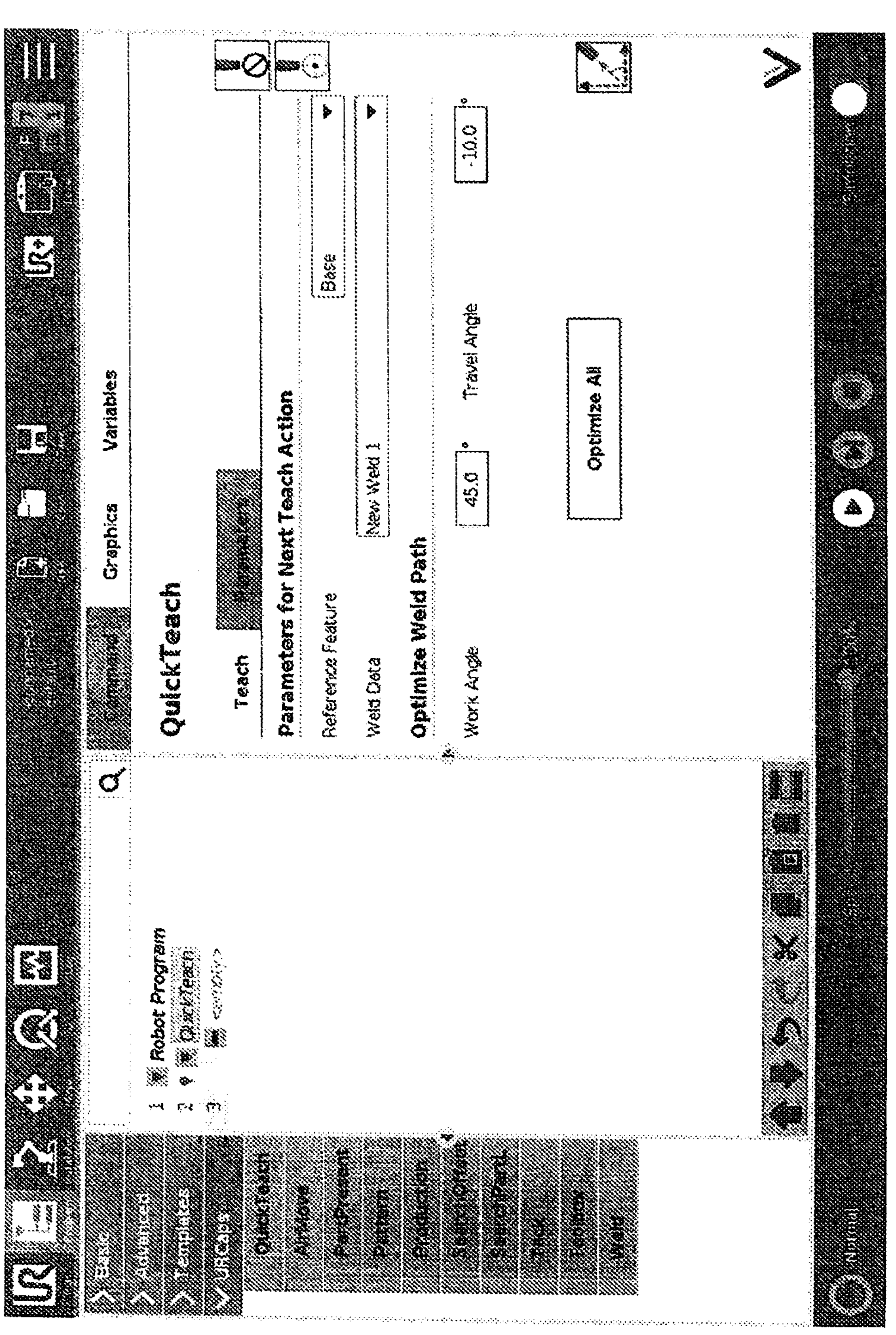
FIG. 13 is an exemplary screen shot of a program window in a teach pendant showing the Dynamic Teach node or QuickTeach commands for angles and process data.

An additional unique feature of the dynamic programmable teaching system is the ability to optimize or correct certain operating features or inputs of a program. For example, in a welding application, the appropriate welding torch work angle and push/pull angle is critical to weld quality and appearance, illustrated in FIG. 13. For plasma cutting operations, the work angle is the only angle that is important. Moreover, the dynamic programmable teaching system is adapted to provide blinking light feedback to an operator to indicate when program parameter entry has been successful, when a given parameter requires adjustment or correction.

In the operation of the collaborative robot welding or cutting system, an operator/programmer would center the cobot over the desired operating space. The operator then programs all necessary weld or cut paths for the particular job being run and titles the program accordingly, by way of example, cutting program at 45 degrees, etc. While the system has been described as performing a welding operation, the description may be applied to a cutting operation, as well.

Figure 15:
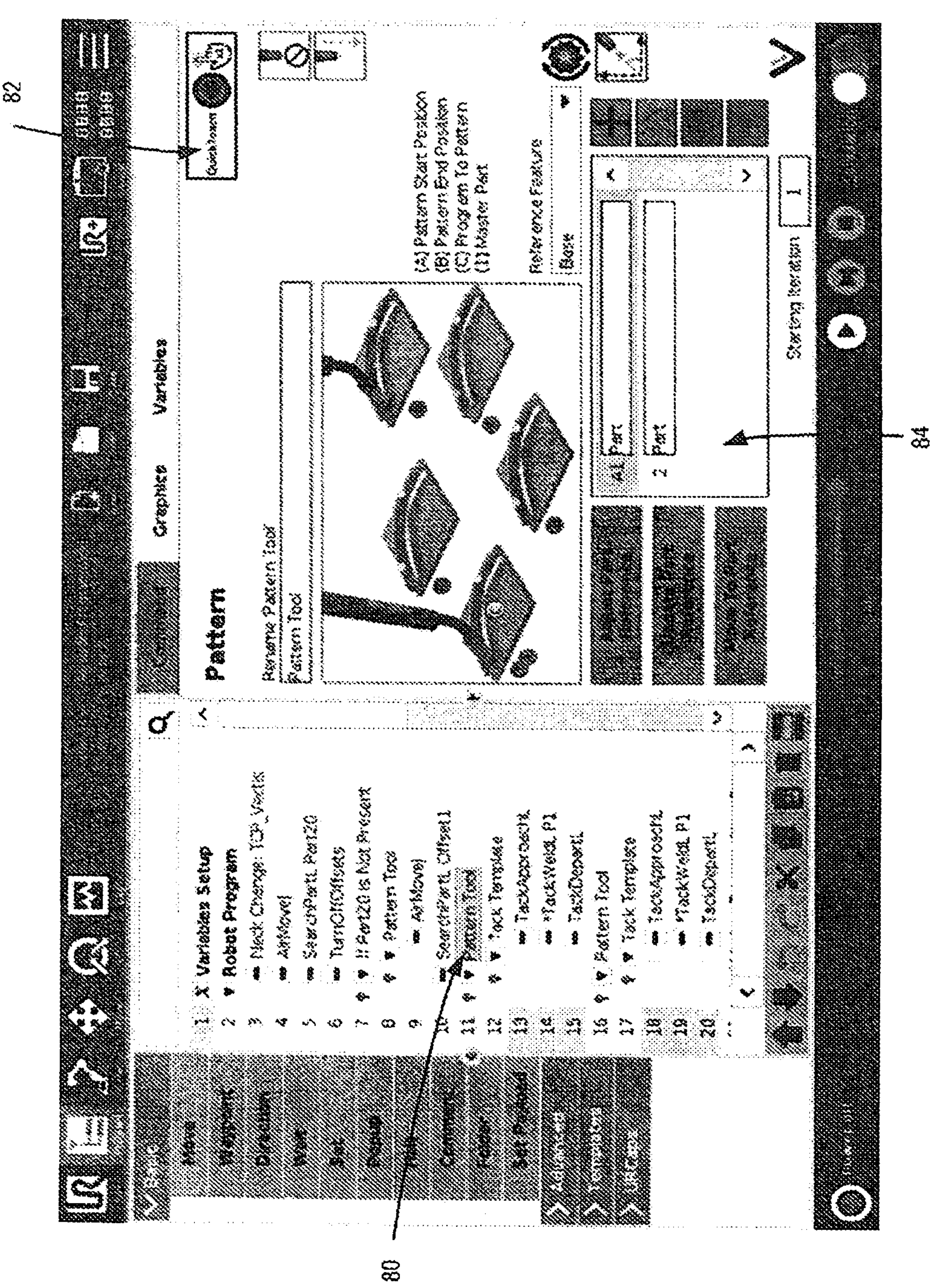
FIG. 15 is an exemplary screen shot of a program window in a teach pendant showing how a programmer can activate dynamic teaching for an individual programming node.
Figure 20A:
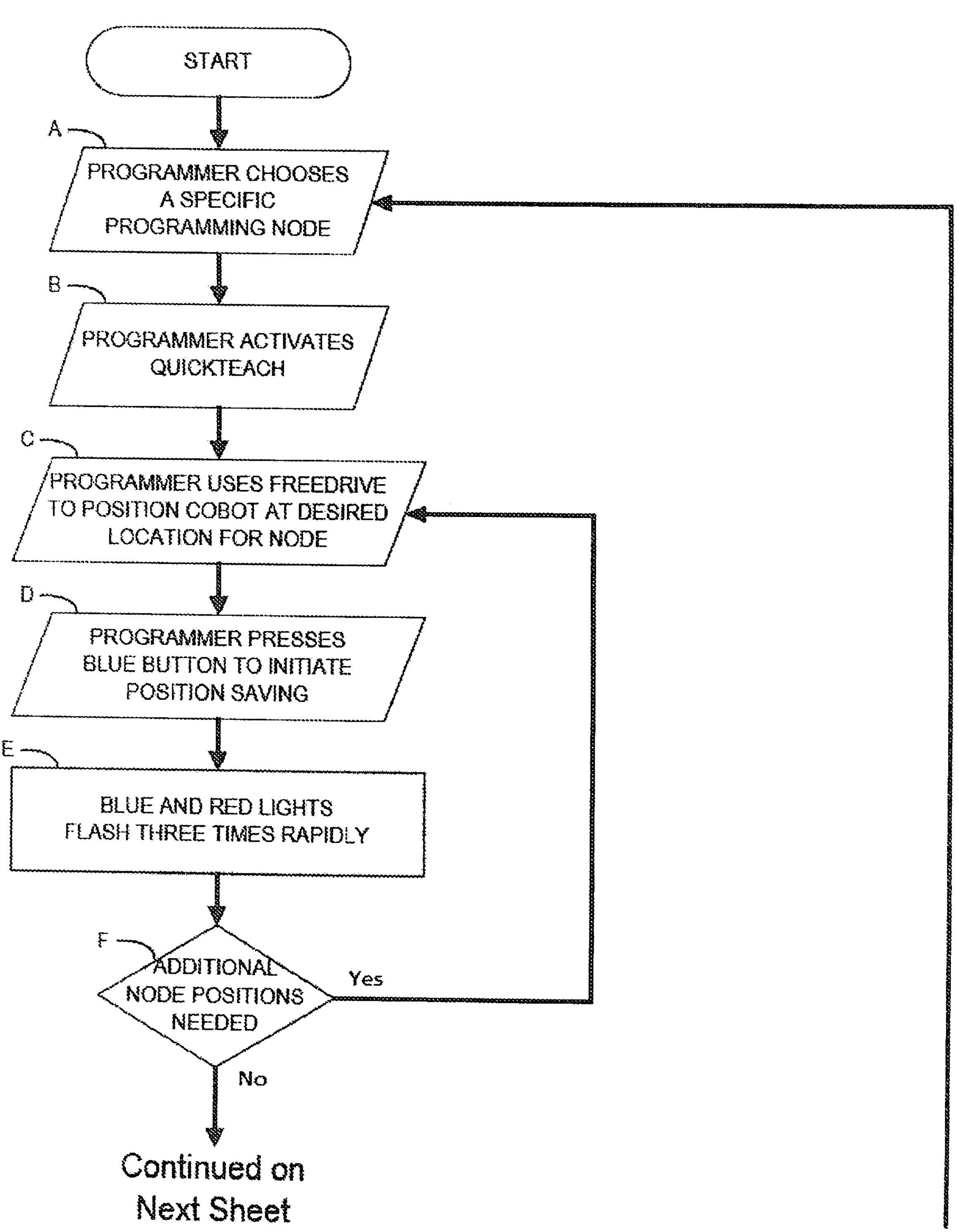
FIG. 20A is a flow diagram illustrating the process workflow steps of a real time teaching feature of a collaborative robot cutting and welding system control system if the programmer where to perform the programming steps by hand on a singular programming node with the dynamic teaching feature.
Figure 20B:
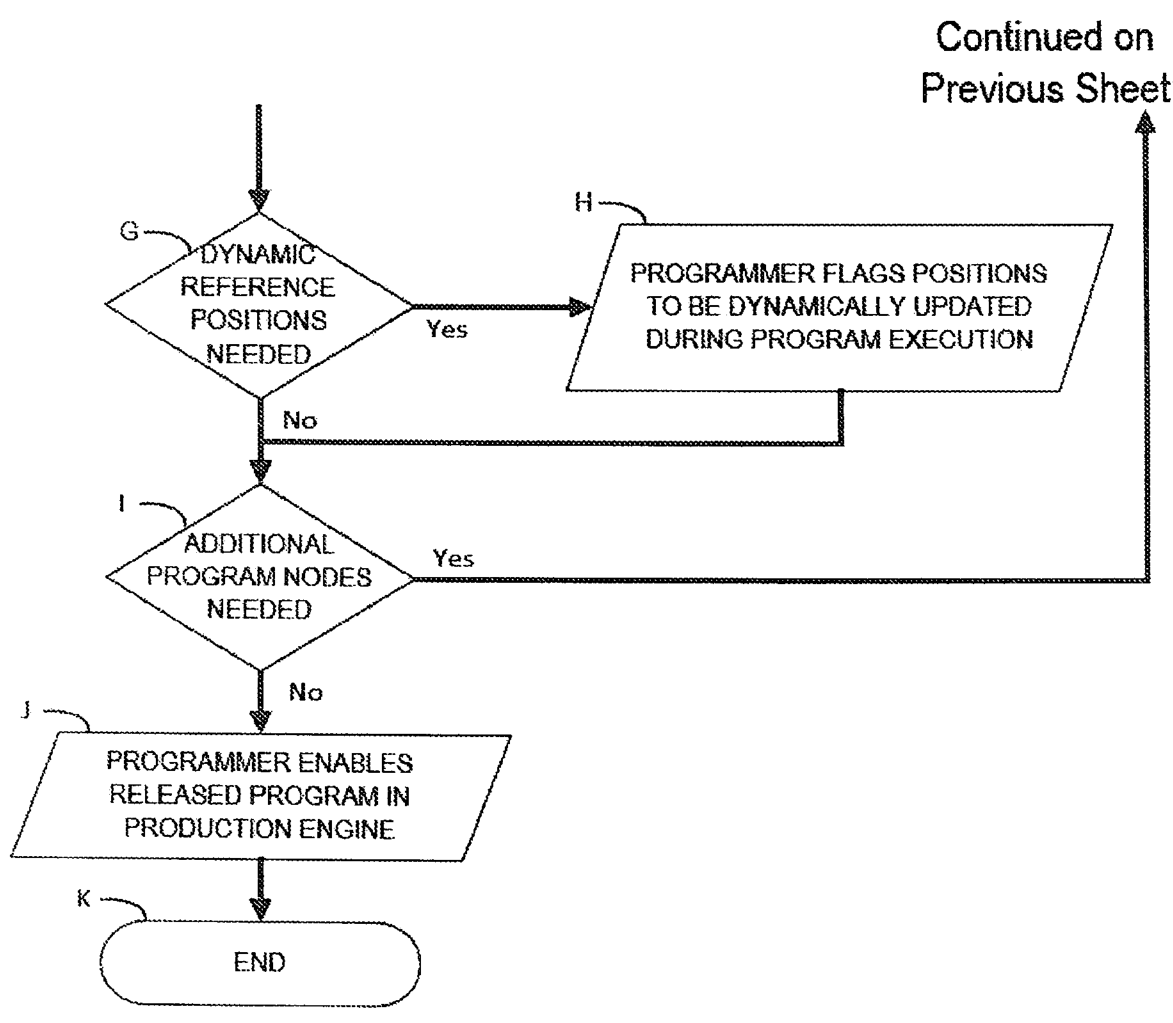
FIG. 20B is a continuation of the process workflow illustrated in FIG. 19A.

Referring now to FIGS. 15, 20A and 20B, a flow diagram or flow chart presents the process steps of a programming node using the novel programming features of the instant invention. These features permit an operator to activate the dynamic teach system for a singular programming node when desiring to expedite programming by hand instead of the full program procedure described later in FIGS. 21A, 21B and 21C.

First, the operator brings the work materials to be welded to the collaborative robot such as where the system 10 is advantageously employed for welding operations. Alternatively, the operator brings the collaborative robot to the work material, as for example, in the situation where welding must be performed in the field, and then powers on the power supply and the collaborative robot. The work material is aligned in accordance with the prescribed specifications set forth in the associated design drawings and specifications and may be tacked, held in a fixture, or otherwise secured in position. At this point at Step A, the operator chooses a specific programming node from a library or collection of saved nodes, by way of example, the node in FIG. 15 at 80 is a Pattern Node. At step B, the operator activates the Dynamic Teaching feature or QuickTeach shown in FIG. 15 at 82. The Dynamic Teaching feature is now active and the operator uses freedrive to position the cobot at the desired location for node, Step C, The operator then presses the blue button to initiate position saving, Step D and at step E, the blue and red LED illuminated push buttons each flash three times rapidly providing feedback to the operator that the dynamic programmable teaching system has recognized the request.

If additional node positions are needed at Step F, then Steps C-E are repeated until the node positioning process is complete. In this programming node example, these positions are saving a list shown in FIG. 15 at 84. Once all positions are taught using the dynamic teaching feature, at Step G the operator then determines if these positions are dynamic reference positions that will be updated during program execution. If these positions are critical to the program, operator flags these positions to be updated during execution, Step H. In instances where these positions are not critical or after the operator flags these positions, the operator then chooses if additional program nodes are needed, Step I, and if so, he or she repeats Steps A-H. If additional nodes are not needed, the operator enables the released program in the production engine, Step J, and the sequence is finished at Step I.

Figure 21A:
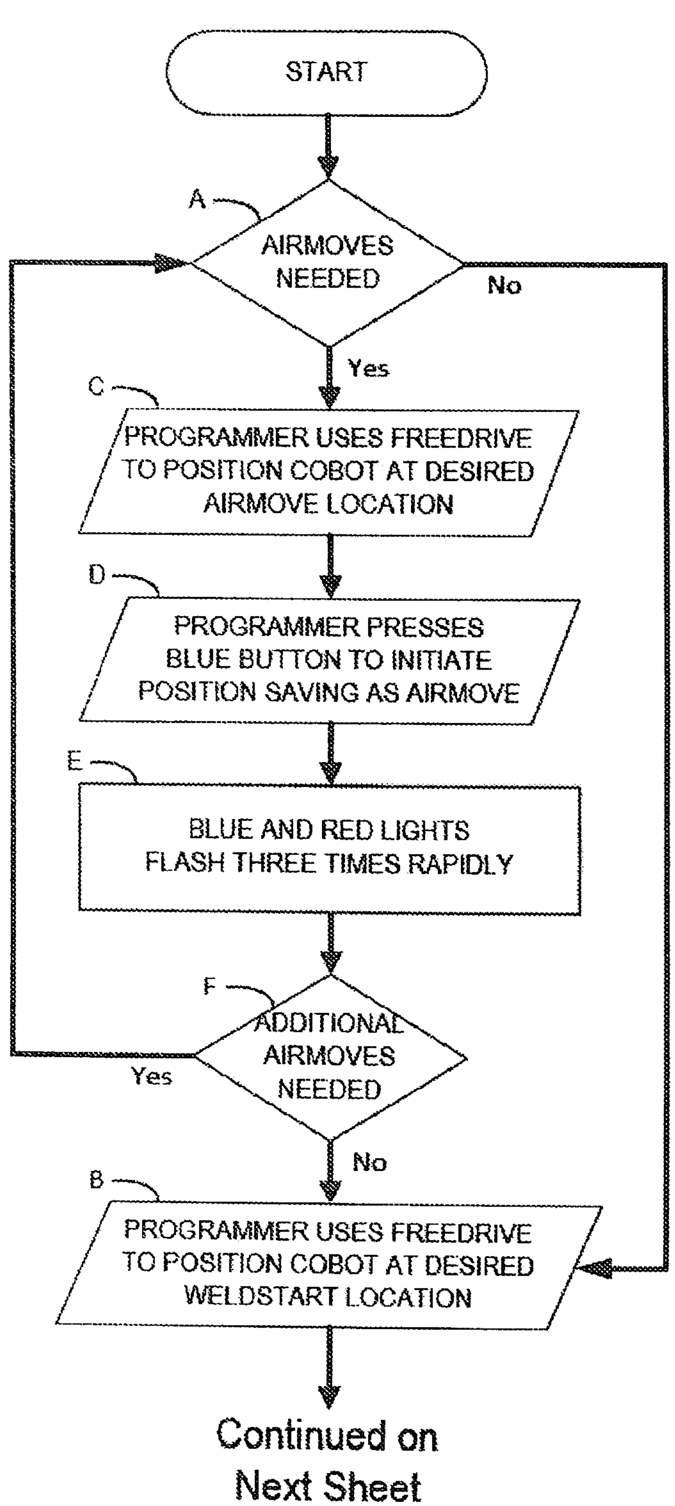
FIG. 21A is a flow diagram illustrating the process workflow steps of a real time teaching feature of a collaborative robot cutting and welding system control system if the programmer where to program the programming steps by use of the buttons with the dynamic teaching feature.
Figure 21B:
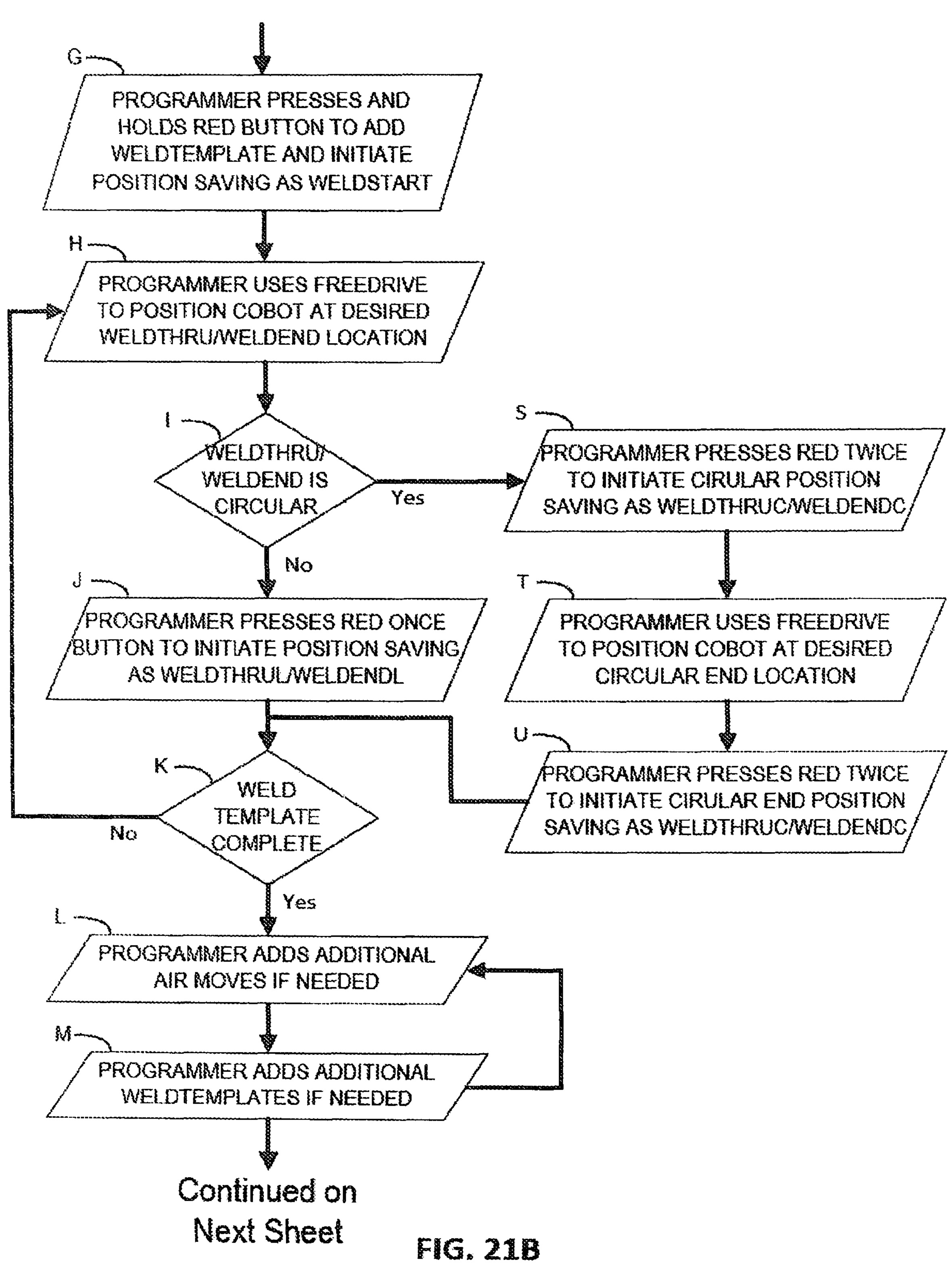
FIG. 21B is a continuation of the process workflow illustrated in FIG. 20A.

Referring now to FIGS. 21A, 21B, and 213C, a flow diagram or flow chart presents the process steps of an exemplary welding job cycle using the novel programming features of the instant invention. These features permit an operator to program a job based upon an existing template by updating a few points or by creating a new template without having to refer to a teach pendant and without having an extensive educational background or computer programming or coding training or experience. For purposes of illustration, the dynamic programmable teaching system will have two push buttons, a red one and a blue one, the operation of each of which will be described below.

First, the operator brings the work materials to be welded to the collaborative robot such as where the system 10 is advantageously employed for welding operations. Alternatively, the operator brings the collaborative robot to the work material, as for example, in the situation where welding must be performed in the field and then powers on the power supply and the collaborative robot. The work material is aligned in accordance with the prescribed specifications set forth in the associated design drawings and specifications and may be tacked, held in a fixture, or otherwise secured in position. At this point at step A, the operator checks to determine if any airmoves are required for the weld path and operation to be performed. If no air moves are needed, at step B, the operator activates the freedrive function via hand-guided jog button 40 to position the welding implement at the desired weldstart location.

If the operator determines that airmoves are required, at step C, he or she activates the freedrive feature to move the welding implement to the desired airmove position and then, at step D, presses a preselected programmed colored button, for example, the blue button, only once. The system recognizes the request and adds an AirMoveL to the programming tree of the cobot as well as detects and enters the current cobot position as the AirMoveL Position. At step E, the blue and red LED illuminated push buttons each flash three times rapidly providing feedback to the operator that the dynamic programmable teaching system has recognized the request. The operator again checks to see if additional airmoves are needed at step F. If the response is affirmative, steps A through F are repeated until the operator determines that airmoves are no longer required and then, at step B, the operator uses the freedrive function to position the cobot at the desired weldstart point.

Figures 16A, 16B:
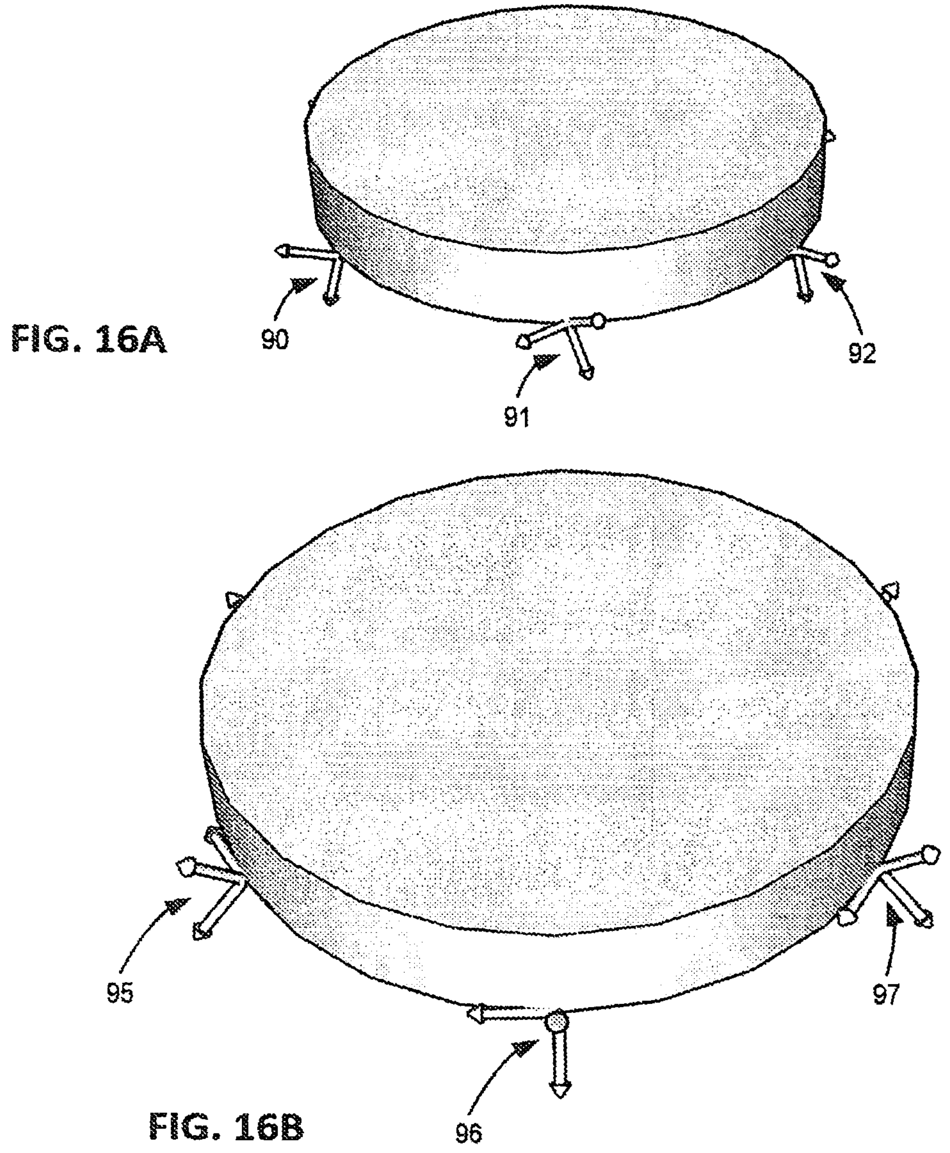
FIG. 16A is a top isometric view of an unoptimized circular weld path illustrating an exemplary first set of work angles and push/pull angles at certain waypoints along the circular weld path.
FIG. 16B is a top isometric view of an optimized circular weld path illustrating an exemplary second set of work angles and push/pull angles at certain waypoints along the circular weld path.
Figures 17A, 17B:
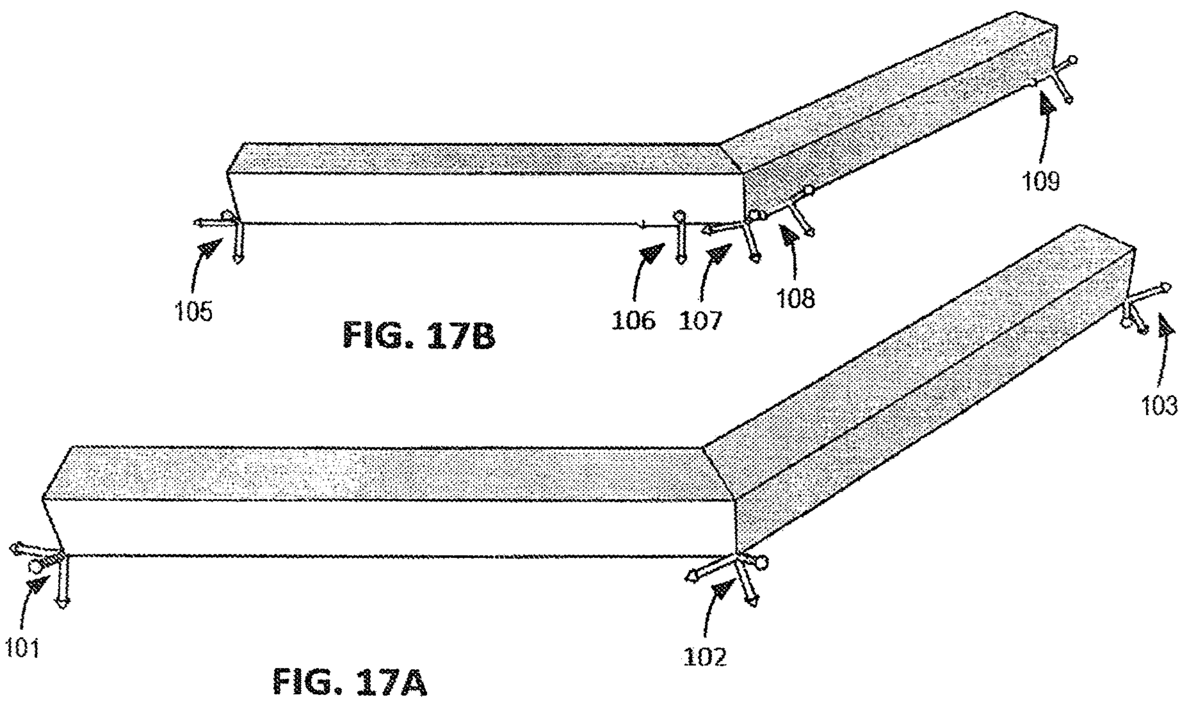
FIG. 17A is a top isometric view of a unoptimized weld path including corners illustrating an exemplary first set of work angles and push/pull angles at a start point, an end point, waypoints, and a way point or corner point along the weld path.
FIG. 17B is a top isometric view of an optimized weld path including corners illustrating an exemplary second set of work angles and push/pull angles at a start point, an end point and a waypoint or corner point along the weld path.
Figures 18A, 18B:
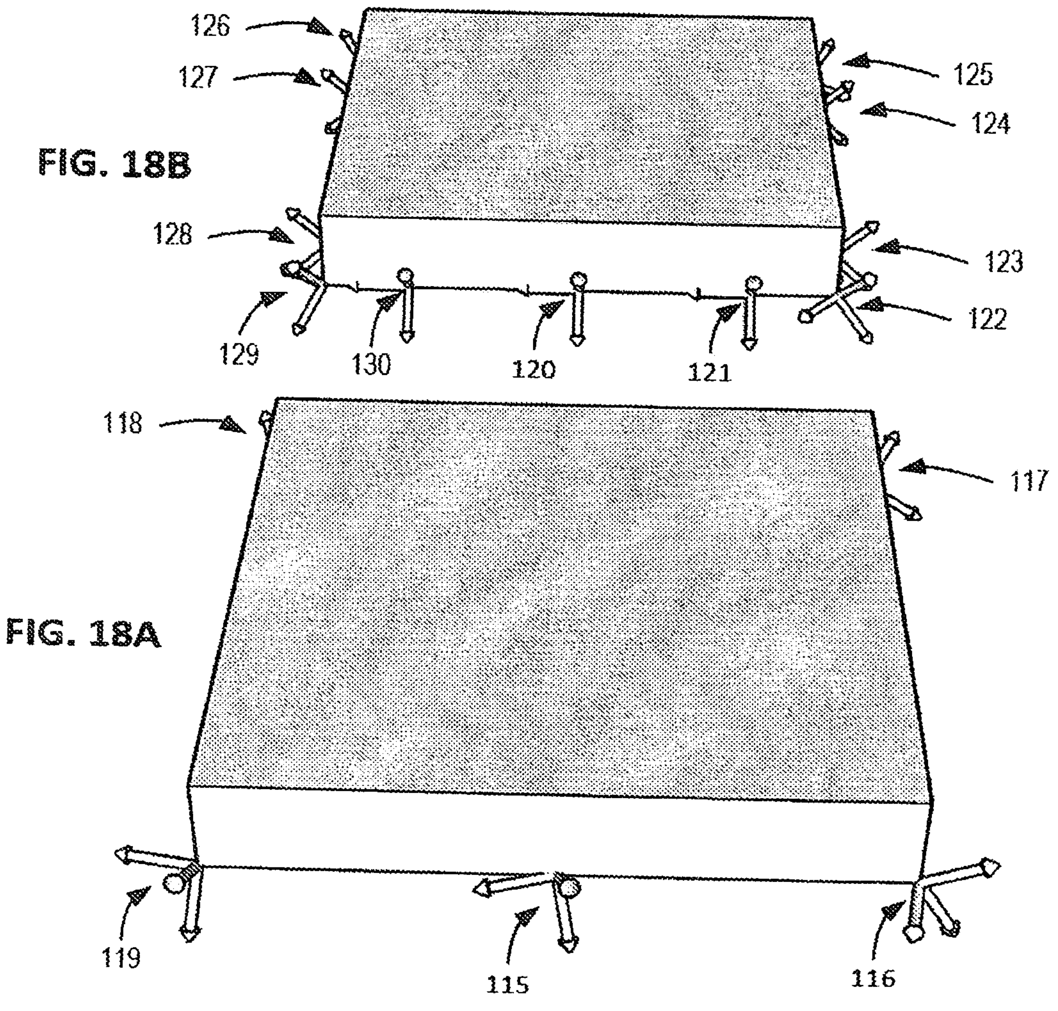
FIG. 18A is a top isometric view of an unoptimized square weld path including corners illustrating an exemplary first set of work angles and push/pull angles at certain start points, end points and waypoints along the square weld path.
FIG. 18B is a top isometric view of an optimized square weld path including corners illustrating an exemplary second set of work angles and push/pull angles at certain start points, end points and waypoints along the square weld path.
Figure 19A:
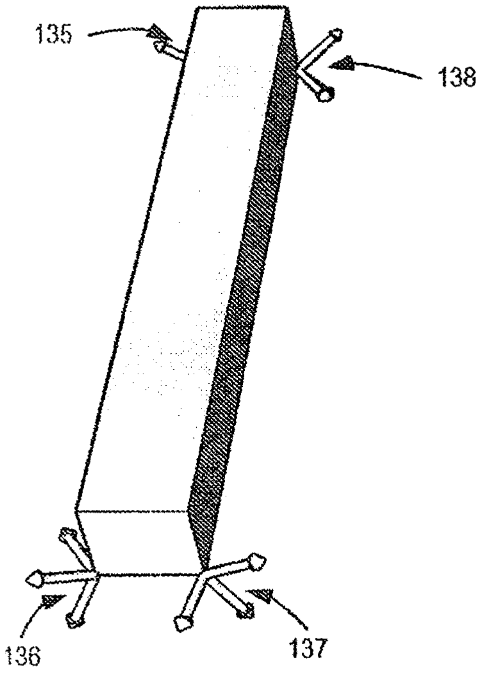
FIG. 19A is a top isometric view of an unoptimized weld path wrap including corners illustrating an exemplary first set of work angles and push/pull angles at certain start points, end points and waypoints along the weld path wrap.

Continuing on to FIG. 21B, after the welding implement is positioned at the weldstart point, at step G, the operator then presses and holds the red push button for at least 2 seconds. The system recognizes the request and adds a Weld Template to the programming tree of the cobot as well as enters the current cobot position as the Weld Start Position. The operator then initiates the freedrive function and moves the cobot to Weld Thru or Weld End position at step H and, at step I, checks to determine if the weld has multiple segments, for example a circular weld such as shown in FIG. 16A having representative segments 90, 91 and 92 representing raw positions with rough work and push/pull angles; a weld path which includes corners such as 101, 102, and 103 shown in FIG. 17A that also shows rough work and push/pull angles as well as no transition positions around the corner. An exemplary circumferential square weld path including corners and segments represented at 115, 116, 117, 118 and 119 is illustrated in FIG. 18A also with rough work and push/pull angles as well as no transition positions around the corners. The operator may also check for a weld path wrap including corners and/or segments such as shown at 130, 131, 132 and 133 in FIG. 19A with rough work and push/pull angles as well as no transition positions around the corners. If the response is negative and a desired linear weld end is needed, the operator presses the red push button once at step J and the weld template is complete, step K. At step L, the operator adds additional airmoves if needed, and at step M, the operator adds any additional required weld templates.

Figure 19B:
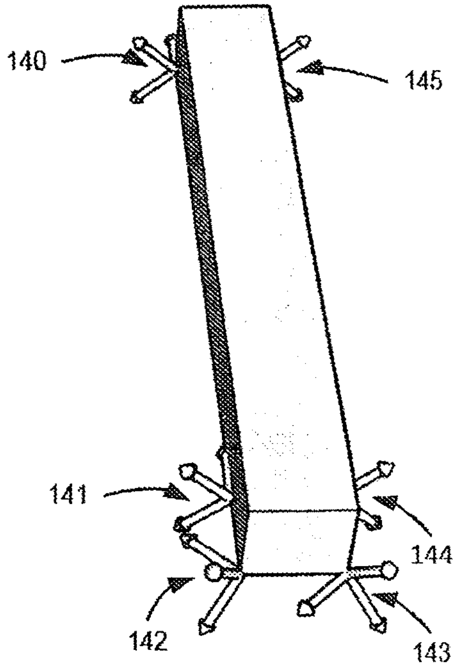
FIG. 19B is a top isometric view of an optimized weld path wrap including corners illustrating an exemplary second set of work angles and push/pull angles at certain start points and end points along the weld path wrap.
Figure 21C:
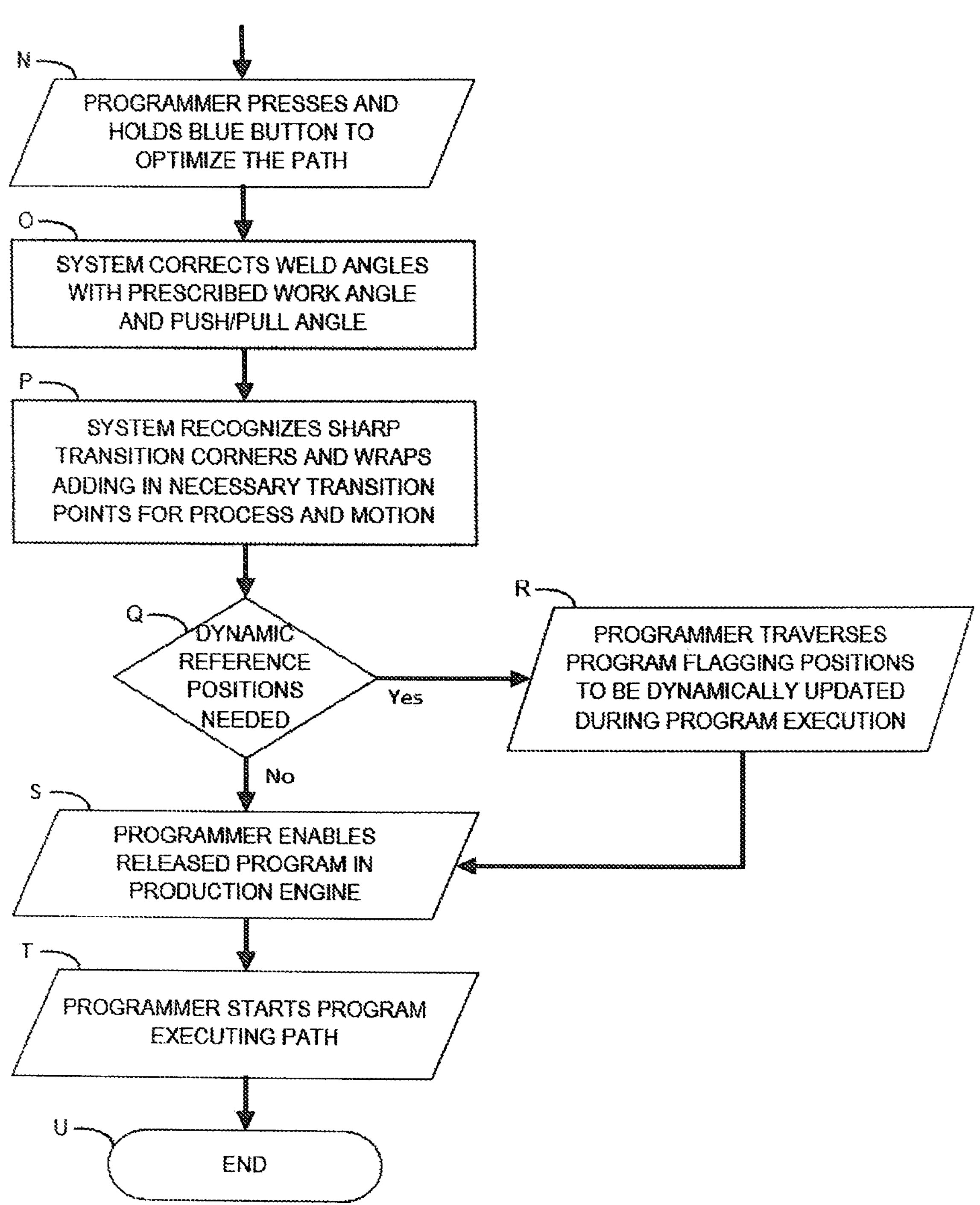
FIG. 21C is a continuation of the process workflow illustrated in FIG. 20A.

Once the operator has completed all the steps through step M, continuing on to FIG. 21C at step N, the operator may press and hold the blue button to initiate an Optimize Path function that corrects weld angles as well as recognize corners and wraps and properly changes the program by adding in the necessary transition points to ensure the process transitions around corners at steps O and P. Examples of an optimized path such as a circular weld such as shown in FIG. 16B having representative segments 95, 96 and 97 representing correct positions with accurate work and push/pull angles; a weld path which includes corners such as 105, 106, 107, 108 and 109 shown in FIG. 17B that shows accurate work and push/pull angles as well as all the necessary transition positions around the corner. An exemplary circumferential square weld path including corners and segments represented at 120-130 is illustrated in FIG. 18B also with accurate work and push/pull angles as well as all the necessary transition positions around the corners. The operator may also check for a weld path wrap including corners and/or segments such as shown at 140, 141, 142, 143, 144 and 145 in FIG. 19B with accurate work and push/pull angles as well as all the necessary transition positions around the corners. At step Q, the operator determines if dynamic reference positions are needed throughout the program and if so, traverses the program flagging positions to be updated during program execution, step R. Once these reference positions are flagged or should the operator not need dynamic reference positions, the operator then enables the released program in the production engine, step S, and initiates program execution at step T which, when completed, ends at step U.

Returning back to step I, if the operator determines that the weld has multiple segments, for example, a circular weld, at step S, the operator presses the red press button twice to create a circle through point, uses the freedrive feature to position the cobot at the desired circular end point at step T, and at step U, again presses the red button twice to create and save a circular end point. Thereafter, the operator proceeds to steps K through R to complete a circular weld. If the weld has multiple segments such as the cornered, squared, or wrapped weld paths referenced above, the operator can keep repeating the process of freediving and pushing the red push button until the path template is complete.

The corner node feature is used to control the transition of both the cobot and the process around a tight corner when an instantaneous change in motion or process cannot be made. The node itself is comprised of three total points that define the transition in, the corner point, and the transition out of the corner. These transition points are limited in distance with minimum distance limits defined based on situations such as the corner configuration, i.e., an inside corner or an outside corner. A programmer can use the guide to define the corner point as well as a point along each straight section to define each vector. Once these points are defined, the programmer calculates the transition points which adjust the transition in and transition out to the necessary minimum distance. Even after these points are calculated, a programmer can still adjust the points further away from the corner; however, moving them closer will generate an error message about minimum distance.

The wrap node (FIGS. 19A and 19B) is used to control the transition of both the cobot and the process around a tight double corner on a thinner vertical member (example 0.75 in to 1 in) when an instantaneous change in motion or process cannot be made. The node itself is comprised of four total points that define the transition in, the edge transition from corner to corner, and the transition out of the corner. These transition points are limited in distance with minimum distance limits defined based on situations such as an inside wrap or an outside wrap. A programmer can use the guide to define the corner points as well as a point along each straight section to define each vector. Once these points are defined, the programmer calculates the transition points which adjusts the transition in and transition out to the necessary minimum distance. Even after these points are calculated, a programmer can still adjust the points further away from the corners but moving them closer will generate an error message about minimum distance.

Figure 22A:
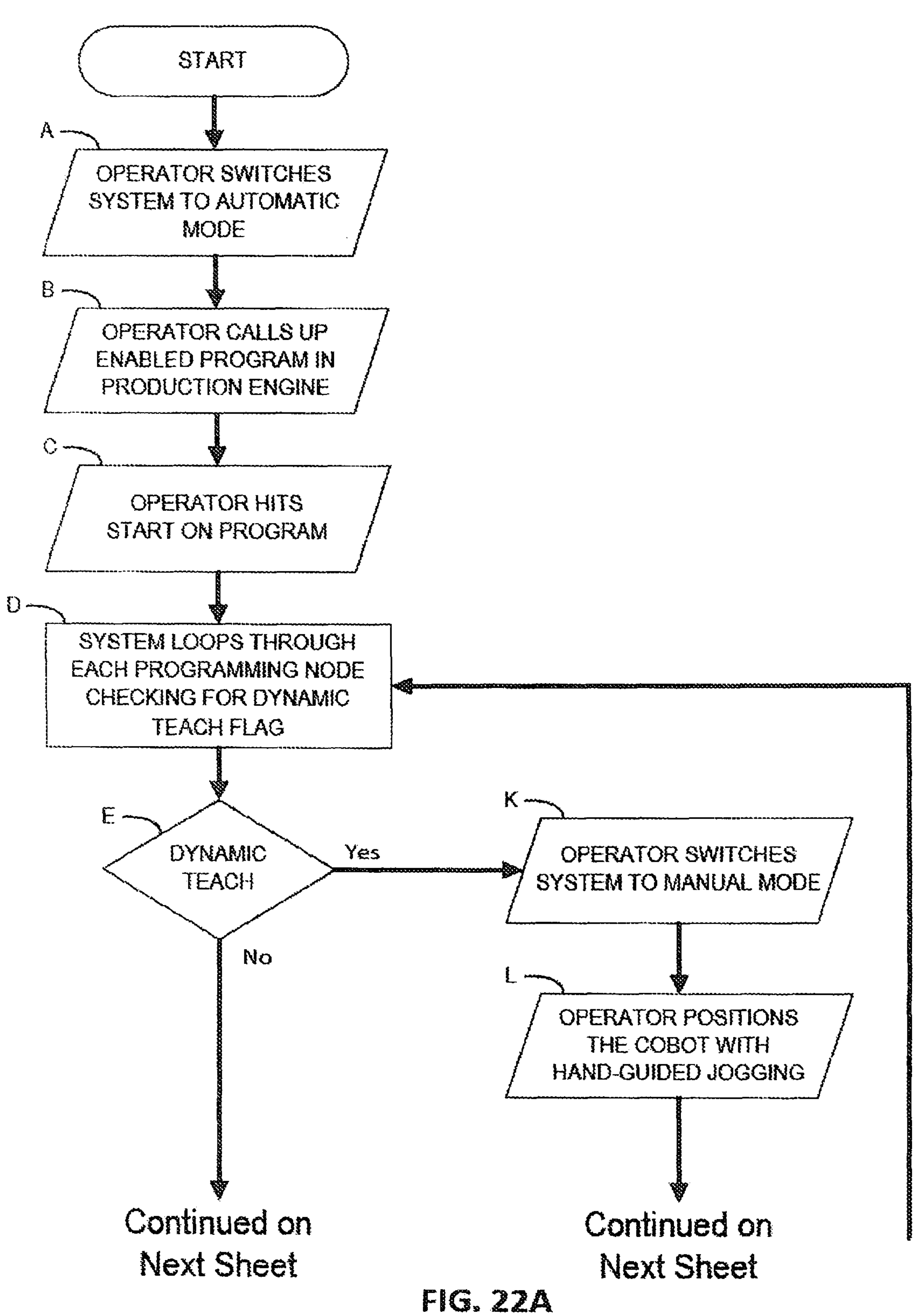
FIG. 22A is a flow diagram illustrating the process workflow steps of a representative workflow illustrating the steps of inquiry for dynamic teach flags in each of the program nodes.
Figure 22B:
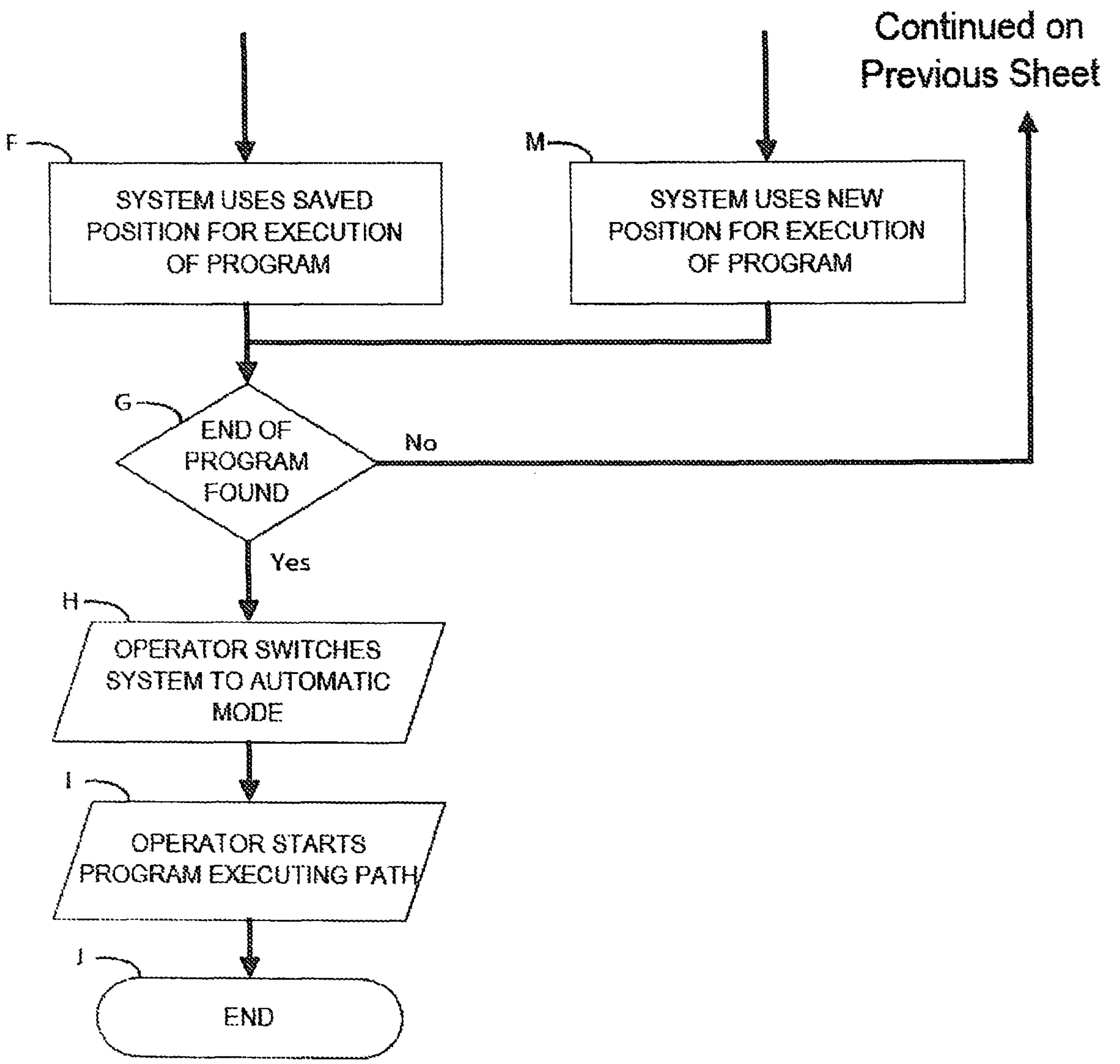
FIG. 22B is a continuation of the process workflow illustrated in FIG. 22A.

A flow chart illustrating an exemplary application of a program having the dynamic teach feature is shown in FIGS. 22A and 22B. Following switching the system to automatic mode Step A, at step B an operator calls up the enabled program of choice stored in a production engine and starts running the program at step C. At step D, the program loops through each programming node checking for dynamic teach flags. Continuing to FIG. 22B, if none are detected at step E, the system then selects saved positions or waypoints for execution of the program at step F. At step G, the program searches for the end point and if found, the operator switches the system back into automatic mode, step H, and starts the program, step I, until the program ends at step J. If the end point is not found at step G, the program path loops back to step D and the program steps are repeated until the program ends.

Referring back to step E, if one or more dynamic teach flags are identified during loops through each programming mode, at step K, the operator switches the system to manual mode. The operator then positions the implement 28 in hand-guided jogging mode at a flagged dynamic teach waypoint, step L, which the system selects for execution of the program at step M. Upon completion of the program execution, the program locates the end of the program at step G, the operator switches the system back into automatic mode, step H, and starts the program, step I, until the program ends at step J.

While only selected embodiments have been chosen to illustrate the present invention, it will be apparent to those skilled in the art from this disclosure that various changes and modifications can be made herein without departing from the scope of the invention as defined in the appended claim. Furthermore, the foregoing descriptions of the embodiments according to the present invention are provided for illustration only, and not for the purpose of limiting the invention as defined by the appended claim and its equivalents.

What is claimed is:

1. A dynamic programmable teaching system adapted to program and control the operation of a collaborative robot welding and cutting system and to optimize or correct operational processing parameters for any given welding or cutting task, the welding and cutting system including a power supply, robot controller, teach pendant, and an application programming interface (API) display, the dynamic programmable teaching system comprising:

a control system housing operatively connected to a distal end of an arm segment of a collaborative robot and to a robot controller and teach pendant;

securing hardware adapted to connect the control system housing to the distal end of the arm segment;

a plurality of programming and control data entry actuators, each of the plurality of programming and control data entry actuators being reciprocally coaxially positioned in a respective cavity or cylindrical aperture formed in the control system housing and operatively connected via a connecting cable to the robot controller, teach pendant and application programming interface (API) display; and a biasing mechanism adapted to urge each of the plurality of control data entry actuators in an outward direction against a respective stop member positioned at a respective outer rim of each of the cavities.

2. The dynamic programmable teaching system of claim 1 wherein the securing hardware comprises one or more threaded fasteners or bolts, each bolt being adapted to releasably threadably engage the clamp piece in locking engagement with the housing.

3. The dynamic programmable teaching system of claim 1 wherein each of the plurality of programming and control data entry actuators comprises a push button.

4. The dynamic programmable teaching system of claim 3 wherein each of the plurality of push buttons is in the form of LED ring illuminated push button.

5. The dynamic programmable teaching system of claim 4 wherein each of the LED ring illuminated push buttons are selectively illuminated by different colored LED's.

6. The dynamic programmable teaching system of claim 5 wherein the colors of the different colored LED ring illuminated push buttons include red, blue, green, and amber.

7. A programmable collaborative robot welding or cutting system comprising:

a robot arm including a plurality of arm segments sequentially pivotally and/or rotatably interconnected to one another;

an electrically isolated base;

a work processing implement operatively connected to a distal end of the robot arm;

a robot controller;

a teach pendant;

an application programming interface (API) display; and a dynamic programmable teaching system adapted to program and control the operation of a collaborative robot welding and cutting system and to optimize or correct operational processing parameters for any given welding or cutting task; the dynamic programmable teaching system including a control system housing operatively connected to a distal end of an arm segment of a collaborative robot and to a robot controller and teach pendant; securing hardware adapted to connect the control system housing to the distal end of the arm segment: a plurality of programming and control data entry actuators, each of the plurality of programming and control data entry actuators being reciprocally coaxially positioned in a respective cavity or cylindrical aperture formed in the control system housing and operatively connected via a connecting cable to the robot controller, teach pendant and application programming interface (API) display; and a biasing mechanism adapted to urge each of the plurality of control data entry actuators in an outward direction against a respective stop member positioned at a respective outer rim of each of the cavities.

8. The programmable collaborative robot welding or cutting system of claim 7 wherein the securing hardware of the dynamic programmable teaching system comprises one or more threaded fasteners or bolts, each bolt being adapted to releasably threadably engage the clamp piece in locking engagement with the housing.

9. The programmable collaborative robot welding or cutting system of claim 8 wherein each of the plurality of programming and control data entry actuators of the dynamic programmable teaching system comprises a push button.

10. The programmable collaborative robot welding or cutting system of claim 9 wherein each of the plurality of push buttons is in the form of LED ring illuminated push button.

11. The programmable collaborative robot welding or cutting system of claim 10 wherein each of the LED ring illuminated push buttons are selectively illuminated by different colored LED's.

12. The programmable collaborative robot welding or cutting system of claim 11 wherein the colors of the different colored LED ring illuminated push buttons include red, blue, green, and amber.

* * * * *